United States Patent [19]

Sandstedt

[11] 4,130,738
[45] Dec. 19, 1978

[54] BIDIRECTIONAL DATA TRANSFER AND STORAGE SYSTEM

[76] Inventor: Gary O. Sandstedt, 3837 Harrison Blvd., Kansas City, Mo. 64109

[21] Appl. No.: 834,911

[22] Filed: Sep. 20, 1977

Related U.S. Application Data

[63] Continuation-in-part of Ser. No. 694,660, Jun. 10, 1976, abandoned.

[51] Int. Cl.$^2$ ............................................. H04M 1/42
[52] U.S. Cl. ................................. 179/90 B; 179/2 DP; 340/147 MD
[58] Field of Search ........... 179/90 B, 90 BD, 90 BB, 179/90 K, 90 CS, 2 DP, 2 C, 1 C; 58/152 T; 70/277, 278, DIG. 51; 317/134; 340/147 RD, 149 R, 149 A

[56] References Cited

U.S. PATENT DOCUMENTS

| | | | |
|---|---|---|---|
| 3,754,214 | 8/1973 | Matsumoto et al. | 340/149 R |
| 3,764,742 | 10/1973 | Abbott et al. | 340/149 A |
| 3,806,874 | 4/1974 | Ehrat | 340/149 R |
| 3,806,882 | 4/1974 | Clarke | 340/149 R |
| 3,845,362 | 10/1974 | Roe | 340/149 R |
| 3,848,229 | 11/1974 | Perron et al. | 340/149 R |
| 3,859,634 | 1/1975 | Perron et al. | 340/149 R |
| 3,872,435 | 3/1975 | Cestaro | 340/147 MD |
| 3,934,122 | 1/1976 | Riccitecci | 340/149 A |

*Primary Examiner*—Kathleen H. Claffy
*Assistant Examiner*—Gerald L. Brigance
*Attorney, Agent, or Firm*—Brady, O'Boyle & Gates

[57] ABSTRACT

A system for bidirectionally receiving and transmitting alpha-numeric digital data via electromagnetic energy coupling means operable in the frequency range extending from radio frequencies upward. More particularly, a portable random access memory unit incorporated in a device such as a wristwatch or other relatively small portable apparatus which is adapted to be programmed by means of a relatively stationary programming device e.g. a telephone handset, when placed in proximity thereto establishes at least one electromagnetic energy communication channel whereby digital data which may be, for example, a plurality of telephone numbers and other selected data are loaded into the portable memory device. Thereafter, the portable memory device is placed in proximity with a relatively static receiver device e.g. a telephone handset, whereupon at least one electromagnetic energy communication channel is established therewith and data is read out of the portable memory device to the receiver for translating said selective data externally for remote utilization such as automatically dialing a telephone or operating a lock or other control devices. Once dialing has been effected selected other data can be fed into the communication channel as well. The communication channel is adapted to carry both digital data and synchronizing clock signals.

38 Claims, 35 Drawing Figures

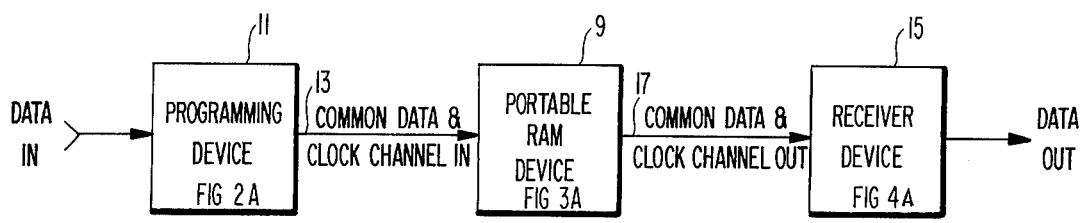
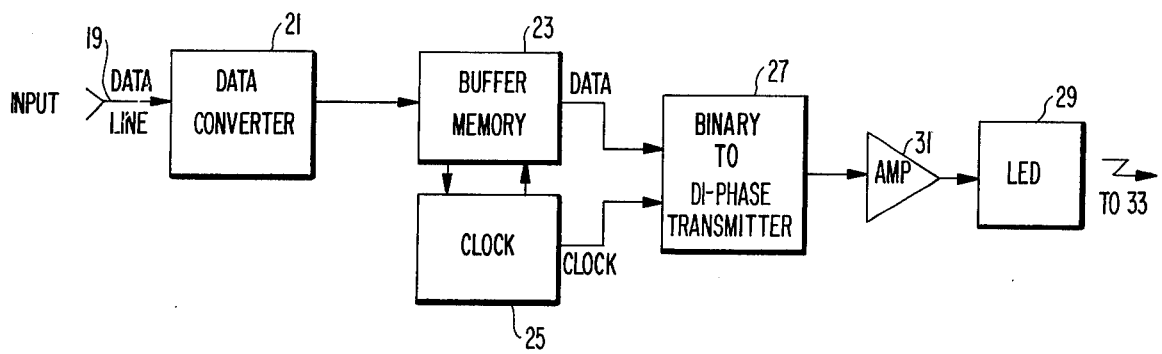
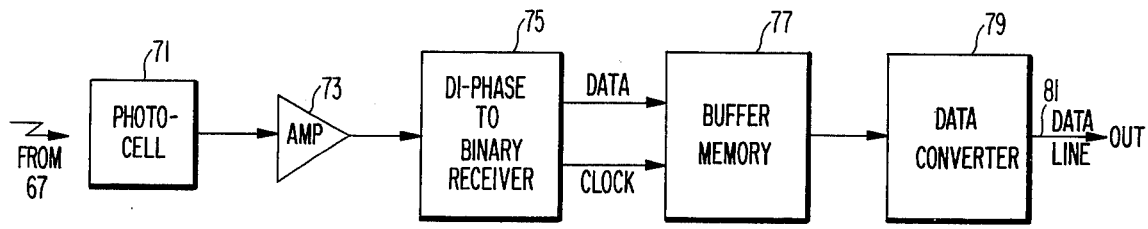

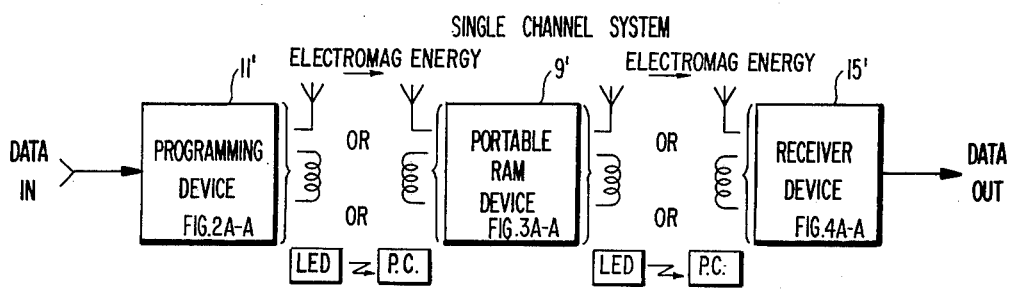
FIG.1A-A
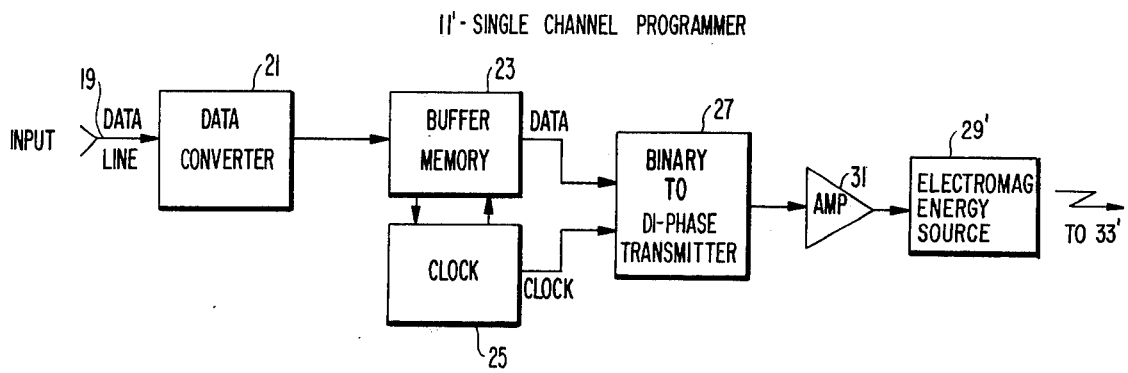
FIG.2A-A
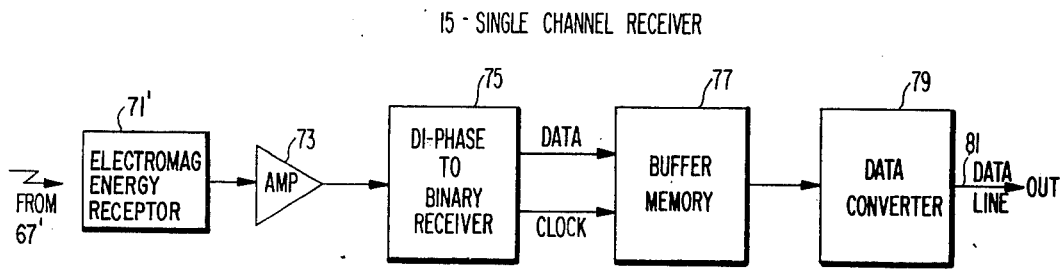
FIG.4A-A

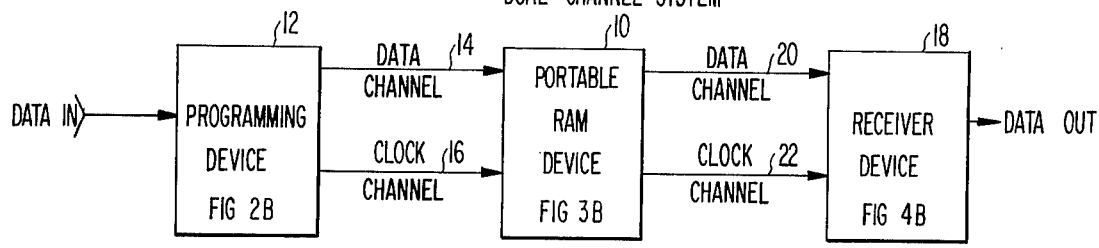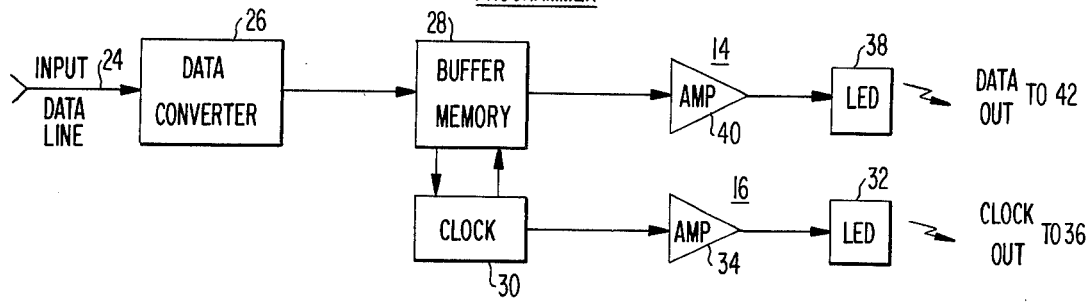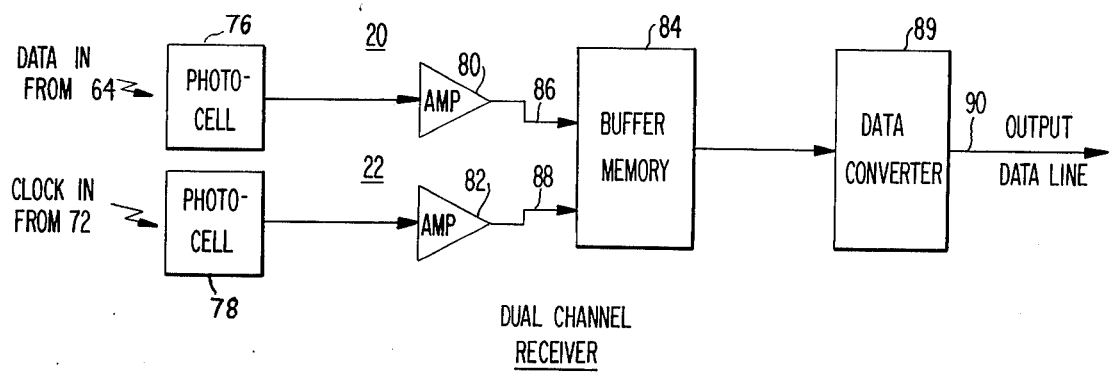

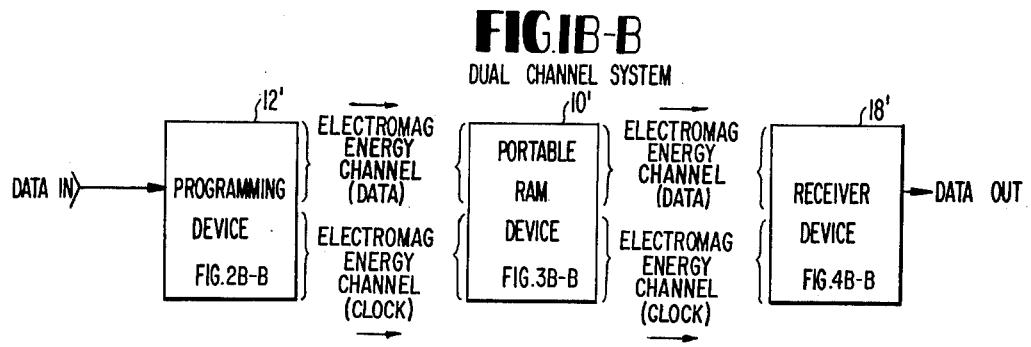
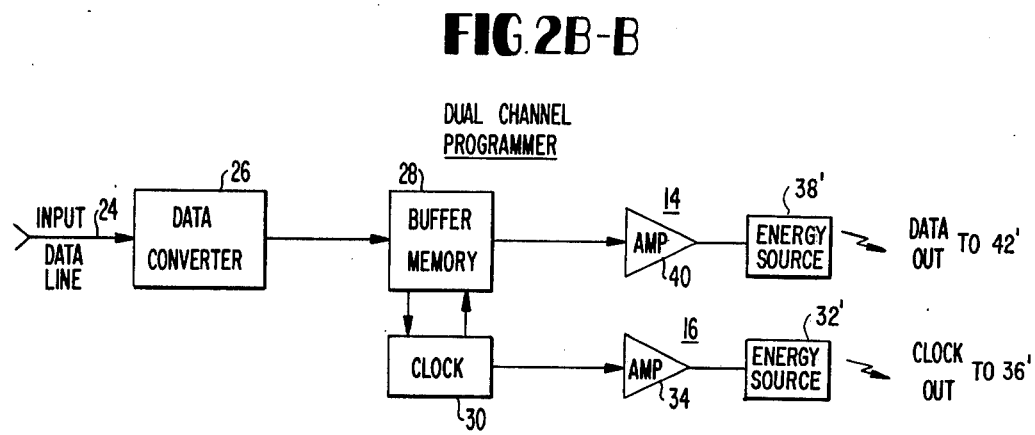
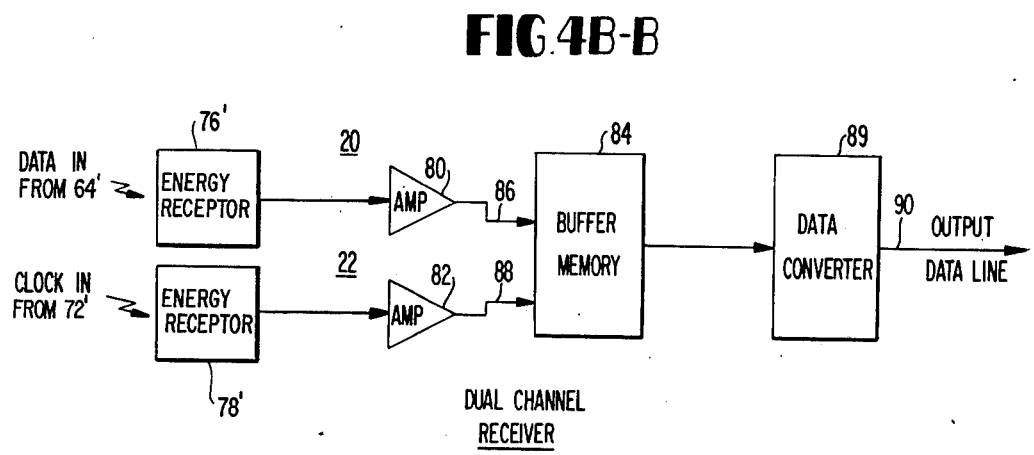

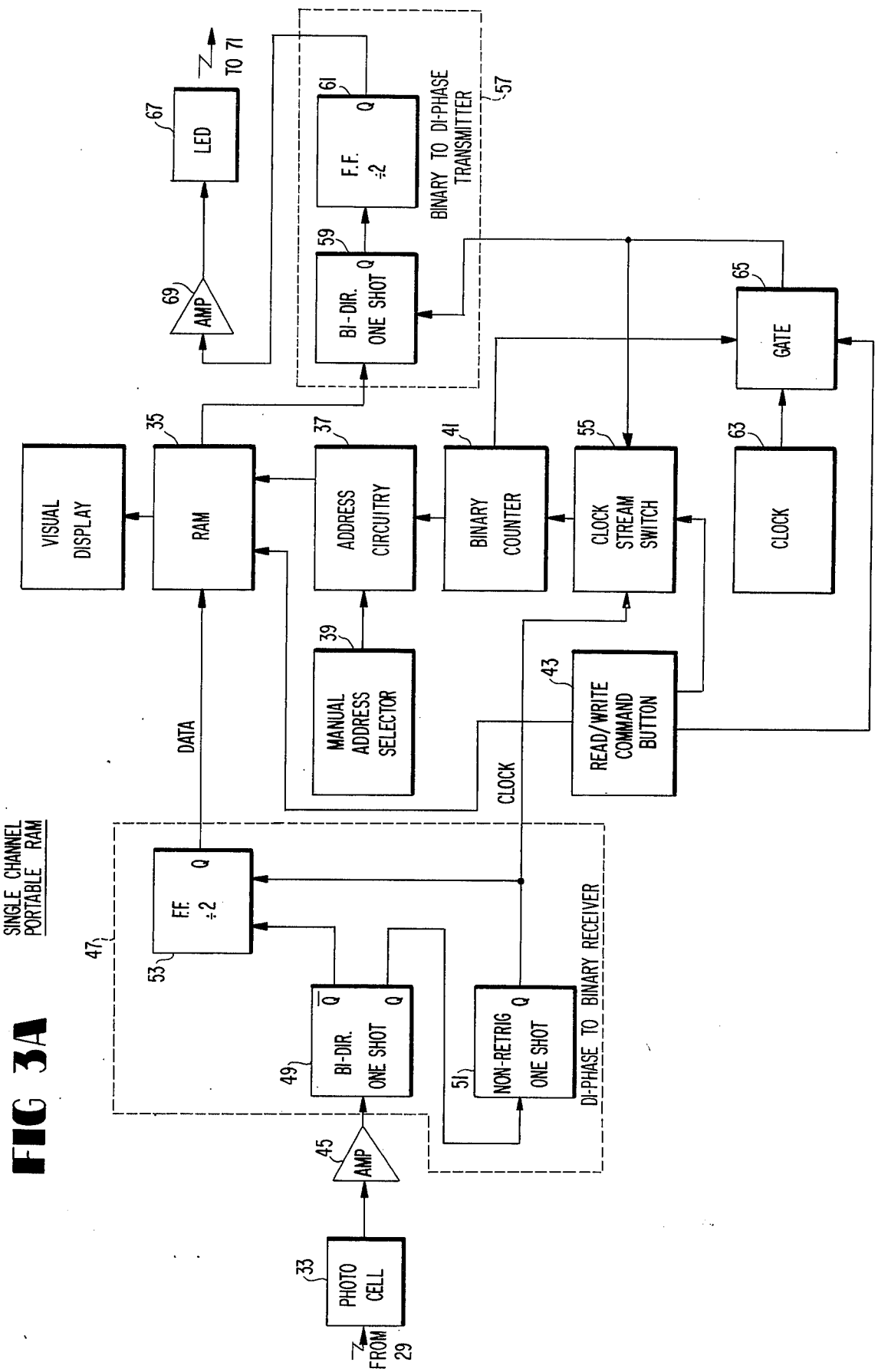

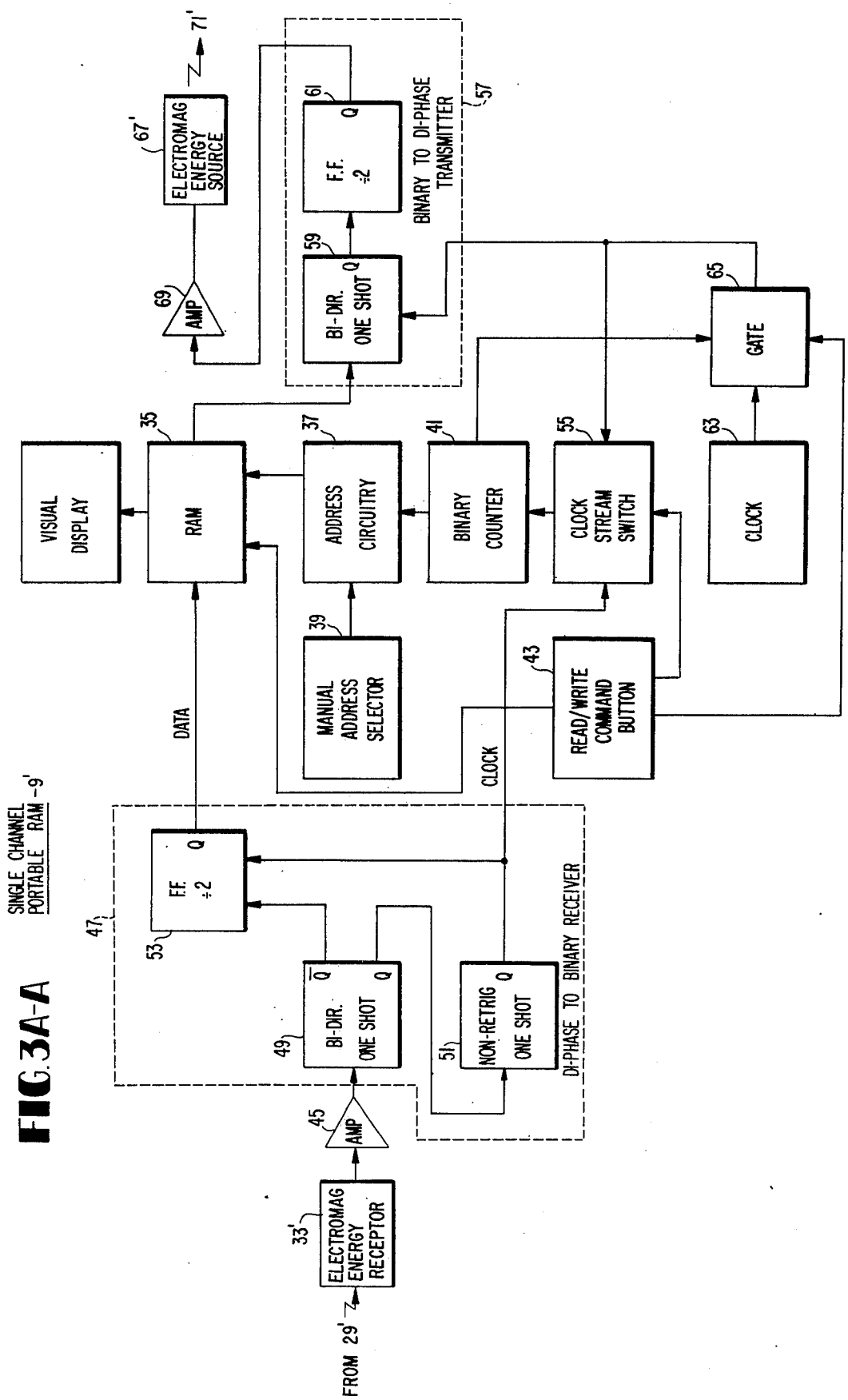

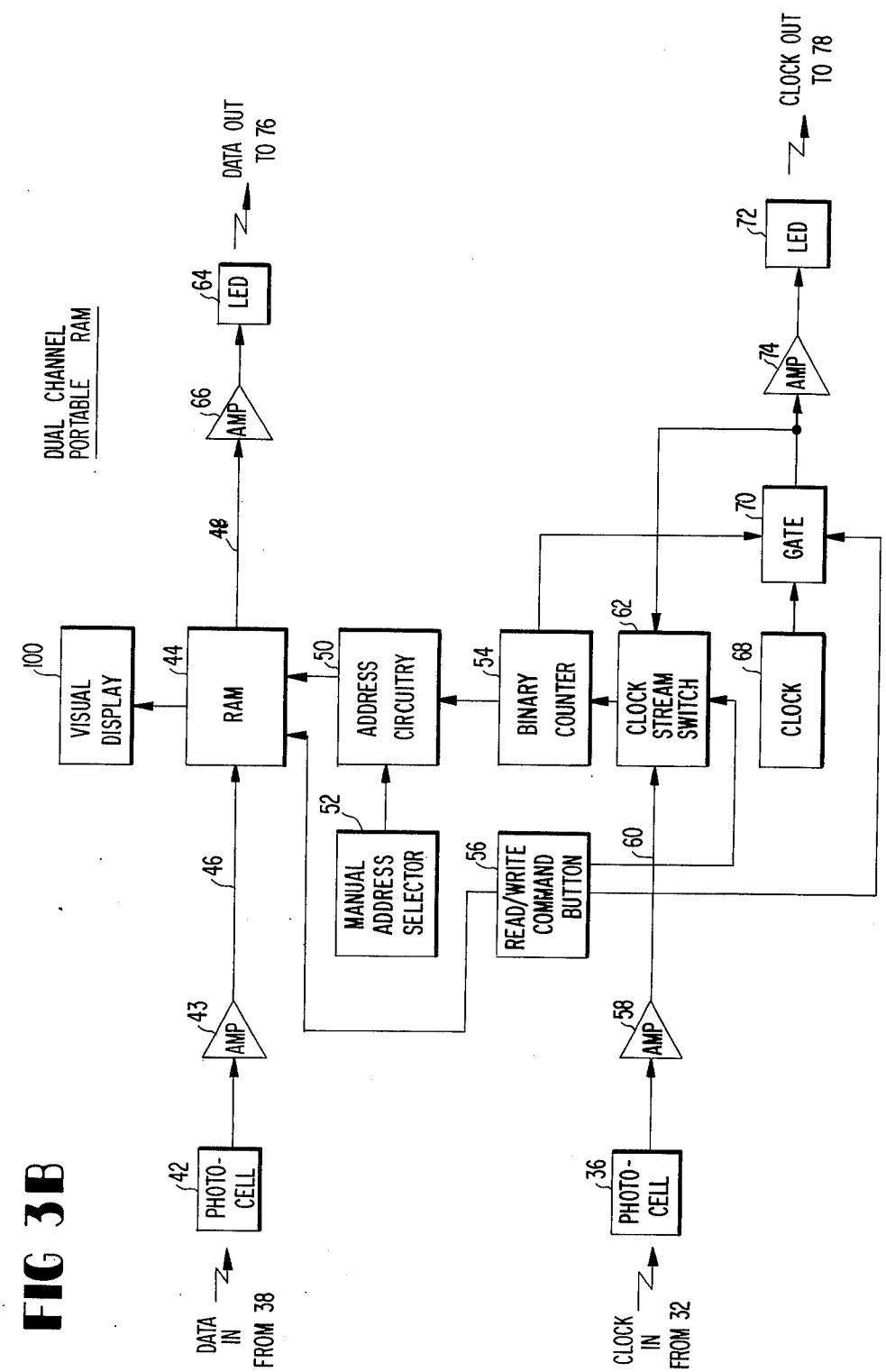

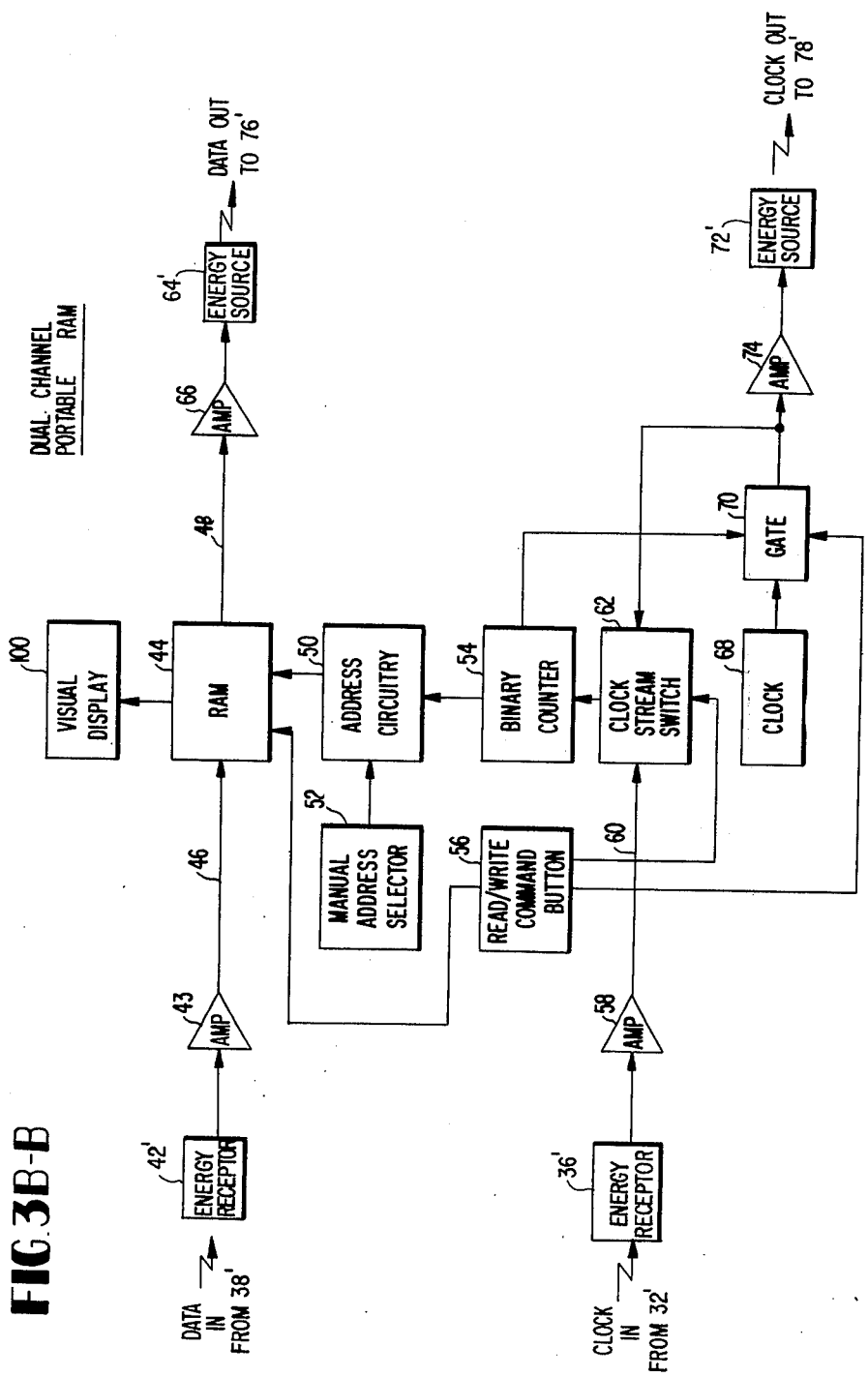

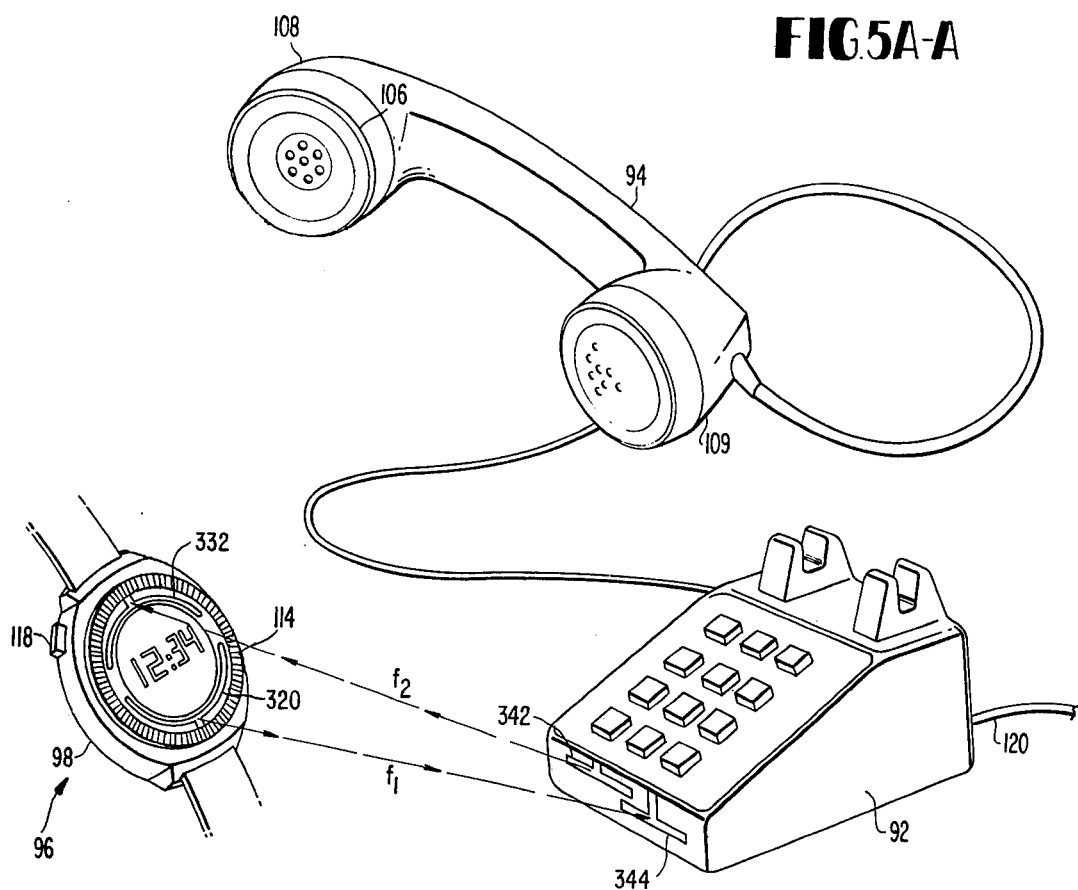
FIG.5A-A
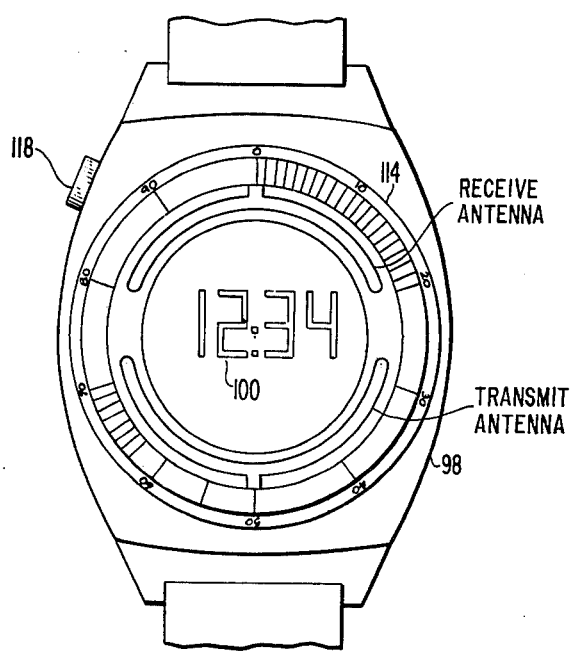
FIG.5B-B

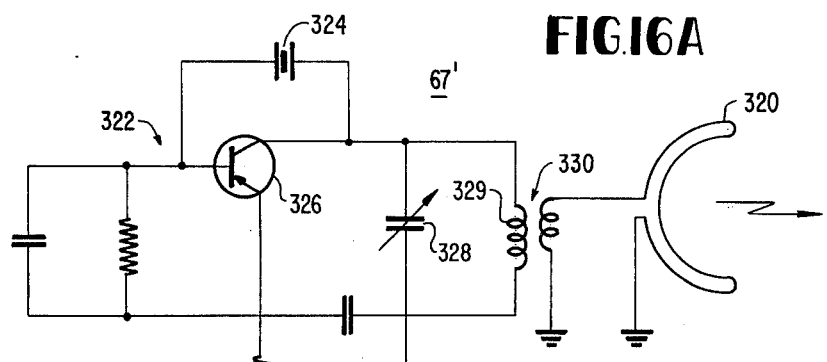
FIG.16A
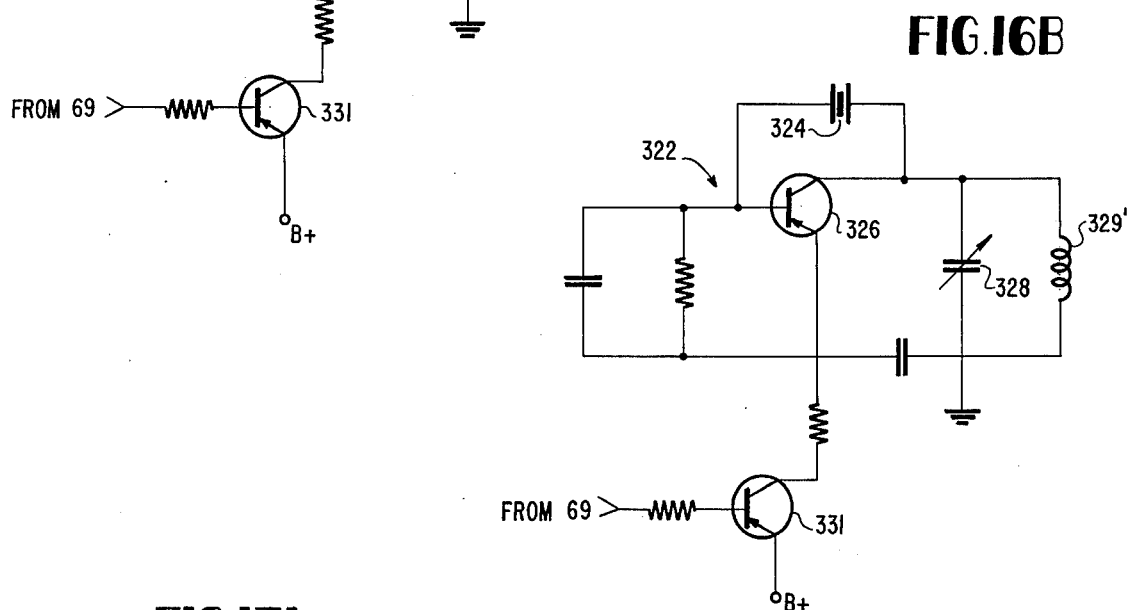
FIG.16B
FIG.17A
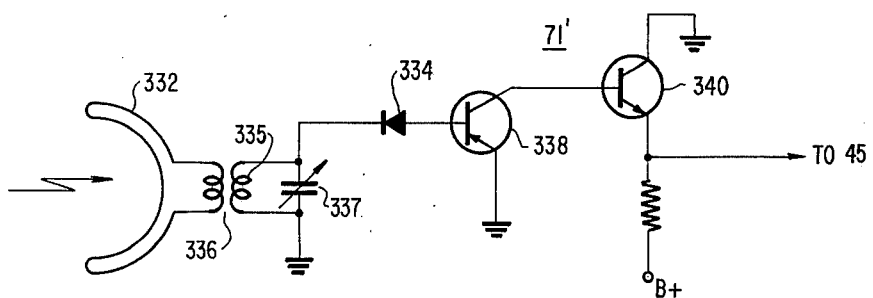
FIG.17B
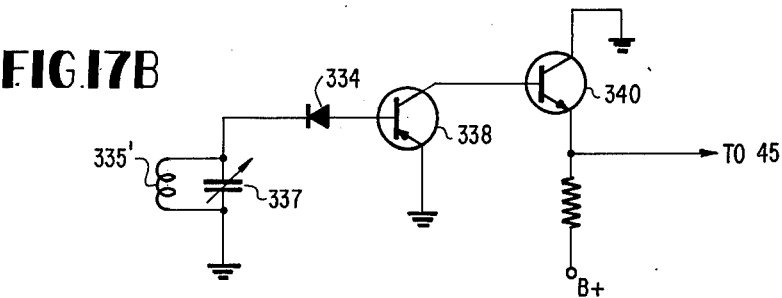

BIDIRECTIONAL DATA TRANSFER AND STORAGE SYSTEM

This is a continuation-in-part application of Ser. No. 694,660, filed June 10, 1976, now abandoned.

BACKGROUND OF THE INVENTION

This invention relates generally to digital communications and more particularly to a system whereby a device adapted to be carried or worn by a person e.g. a wristwatch or the like, has selective data stored therein which is adapted on demand to communicate by means of electromagnetic energy selected data to an external device for automatically controlling a desired function in accordance with the data transmitted thereto.

Electronic watches adapted to provide ancillary operations are well known. For example, the watch may additionally include means for functioning as a simple calculator, thermometer, or a radio receiver which may utilize all or part of the display of the watch. Also acoustic coupler devices associated with telephone apparatus are known as well as repertory dialers having digital storage means.

SUMMARY

The present invention is directed to a system including a portable random access memory unit which is selectively programmed through first electromagnetic energy coupling means, as opposed to acoustic coupling means, with certain digital information and which is subsequently utilized on demand to communicate selected alpha-numeric digital information to another device through second electromagnetic energy coupling means, which is adapted to receive said information and automatically execute a desired function. The electromagnetic energy coupler means contemplated is both of the induction and radiant type, being operative accordingly at any AC frequency, including radio frequencies and above.

In one embodiment of the invention, a solid state random access memory including its associated input and output circuitry as well as the necessary control circuitry is incorporated in a portable device such as an electronic wristwatch which additionally includes on its face means for being placed into registration first with a programming device and then a receiver device. At least one light-responsive means is included on the watch's face for receiving information in digital form from said programming device. The programming device includes light emitting means whose output is coupled to the light responsive means of the portable device when the two devices are in registration, with the light emitting means being modulated in accordance with the information to be read into the random access memory. The programming device may be incorporated in and operated in conjunction with, for example, a conventional telephone set. The face of the watch additionally includes light emitting means which is adapted to be modulated by a selected data read out from the memory which upon being placed in registration with the receiver device, having respective light-responsive means, is adapted to provide an output signal for communicating with an external or remote instrumentality. The system is adapted, for example, to load in a repertory of telephone numbers and other selected data into the portable random access memory which on demand is able to automatically dial a selected telephone number when the portable device is placed in registration with the receiver device which may, when desirable, also be incorporated in the telephone set. Once dialing is effected said other selected data can also be fed to or received from the telephone line on demand for its intended purpose. The invention furthermore can be implemented in both single channel and dual channel form depending on the requirements of the user for the translation of data and clock signals.

Other electromagnetic energy coupling means may be utilized depending upon the task required to be performed. For example, both induction and radiation electromagnetic fields at any alternating current frequency including conventional radio frequency and microwave frequencies can be implemented. Also the invention is adapted to be operated at infrared and ultraviolet frequencies and conceivably at X-ray and gamma ray frequencies as well.

BRIEF DESCRIPTION OF THE DRAWINGS

FIGS. 1A and 1A-A are block diagrams broadly illustrative of a single channel version of the subject inventive concept;

FIGS. 1B and 1B-B are block diagrams broadly illustrative of a dual channel version of the subject inventive concept;

FIGS. 2A and 2A-A are electrical block diagrams further illustrative of the single channel programming devices shown in FIGS. 1A and 1A-A, respectively;

FIGS. 2B and 2B-B are electrical diagrams further illustrative of the dual channel programming devices shown in FIGS. 1B and 1B-B, respectively;

FIGS. 3A and 3A-A are electrical block diagrams illustrative of the random access memory and associated circuitry incorporated in the single channel portable devices shown in FIGS. 1A and 1A-A, respectively;

FIGS. 3B and 3B-B are electrical block diagrams illustrative of the random access memory and associated circuitry incorporated in the dual channel portable devices shown in FIGS. 1B and 1B-B, respectively;

FIGS. 4A and 4A-A are electrical block diagrams further illustrative of the single channel receiver devices shown in FIGS. 1A and 1A-A, respectively;

FIGS. 4B and 4B-B are electrical block diagrams further illustrative of the dual channel receiver devices shown in FIGS. 1B and 1B-B, respectively;

FIGS. 16A and 16B are electrical schematic diagrams of radio frequency transmitter circuits which are adapted to be utilized as an electromagnetic energy source for the embodiment shown in FIGS. 1A-A through 5B-B; and FIGS. 17A and 17B are electrical schematic diagrams of radio frequency receiver circuits which are adapted to be utilized as an electromagnetic energy receptor for the embodiment shown in FIGS. 1A-A through 5B-B.

DESCRIPTION OF THE PREFERRED EMBODIMENTS

Figure 5A:
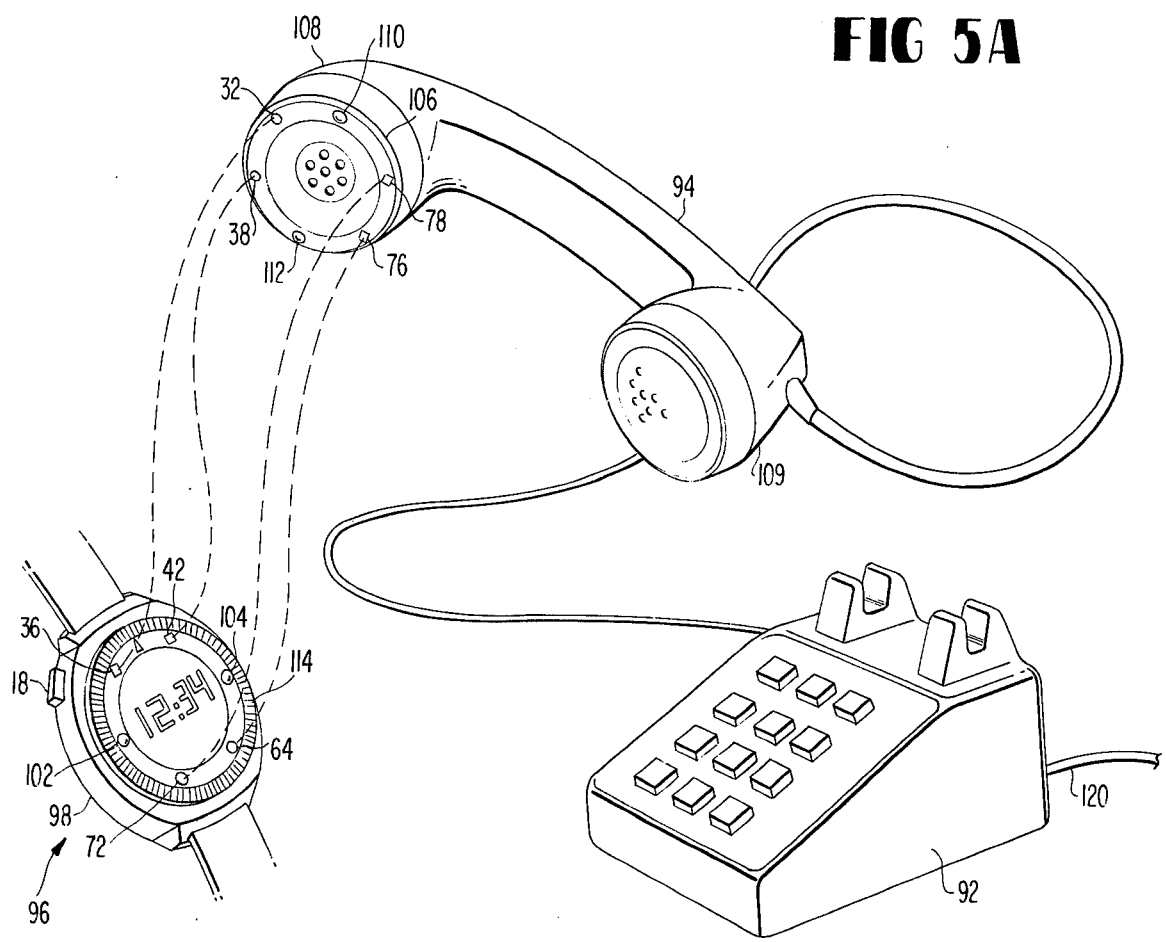
FIGS. 5A and 5A-A are perspective views of dual channel embodiments of the subject invention utilized in connection with a telephone dialing system and wherein the random access memory is incorporated in a wristwatch.

In its broadest aspect, the present invention includes a random access memory, commonly referred to as a RAM, a device well known to those skilled in the art of semiconductor integrated circuits. The RAM is adapted to be portable by being incorporated in a device carried or worn by a person and which is adapted to be programmed with selected digital information which can then be subsequently utilized on demand to provide a read out of selected digital information which is communicated to external or remote apparatus for accomplishing a desired function automatically. One illustrative, but by no means restrictive, purpose of the subject system is to operate as a repertory telephone dialer. The system can also be used, for example, to facilitate operation of a lock system for doors and safes as well as communicating with other complex and simple systems such as cars, boats, airplanes, business machines and computers and other forms of scientific and medical instrumentations for supplying or receiving certain specific instructions.

Considering first the single channel system, reference is directed to FIG. 1A. There a single channel portable Random Access Memory device or RAM 9 is incorporated, for example, in an electronic watch, not shown. The RAM 9 has data loaded into it by means of a single channel programming device 11, which is adapted to receive input data (analog or digital) which is then transferred in digital form to the RAM via a common data and clock channel 13. The contents of the portable RAM 9 are selectively read out to a single channel receiver device 15 through a common data and clock channel 17. The receiver device 15 is adapted to accept the data read out from the portable RAM 9 and transform or decode the data in a suitable fashion for an external utilization device not shown.

Where, for example, the programming device 11 and receiver device 15 are located on a common piece of apparatus, such as a telephone set, bi-directional data transfer is readily achievable by placing the portable RAM 9 in close proximity, i.e. in registration with the programming device 11 whereupon the input data and clock channel 13 is established for loading the RAM with selected data. The RAM 9 is then disengaged from the programming device 9 and at some desired later time is again placed in registration with the receiver device 15 wherein the output data and clock channel 17 is established and selected data is read out from RAM 9 to receiver 15.

Although not meant to be interpreted in a limiting sense, the common data and clock channels 13 and 17 of the system shown in FIG. 1A are implemented by way of example by electromagnetic energy means both inductive and radiant and, more particularly, by respective radiant light emitting means such as a light emitting semiconductor diode optically coupled to light responsive means such as a semiconductor photocell.

To this end, attention is now directed to FIGS. 2A, 3A and 4A. FIG. 2A is intended to more specifically illustrate the programming device 11 shown in FIG. 1A. Accordingly, an input data line 19 which is adapted to carry, for example, analog data, is fed to an analog to digital data converter 21 which is adapted to transform the analog input data into binary digital form which is then fed to a buffer memory 23, a well known device, under the control of a clock circuit 25 which is adapted to provide timing signals for the buffer memory 23 as well as a binary to di-phase transmitter 27, to be described with reference to FIG. 3A, which is adapted to implement means for transmitting data and clock information over the same transmission link. The output of transmitter is coupled to a light emitting diode 29 through an amplifier 31 to provide the common input channel 13 shown in FIG. 1A. The data and clock signals applied to the light emitting diode 29 modulate the light output from the diode to provide a series of light pulses which are adapted to be coupled to a photocell 33 shown in FIG. 3A so that when the portable RAM 9 is in registration with the programming device 11 shown in FIG. 1A, the contents of the buffer memory 23 is coupled to the photocell 33 shown in FIG. 3A.

Referring now to FIG. 3A, there is disclosed the details of the various elements utilized to implement the portable RAM 9 shown in FIG. 1A and its associated circuitry. Reference numeral 35 designates a random access memory array comprised of a plurality of memory elements or storage cells which may be fabricated, for example, on a semiconductor chip. Such a device is well known to those skilled in the art and comprises an off-the-shelf item from any major manufacturer of semiconductor components. Associated with the array 35 is suitable address circuitry 37 which enables any one of the plurality of storage cells in the array 35 to be addressed in accordance with manual address selector means 39, to be described subsequently. Memory locations are accessed in timed sequence by means of the output of a binary counter 41 which operates in response to a clock signal stream. In the read-in or WRITE mode, as directed by READ/WRITE command means 43, the clock stream is developed from the input pulses directed to the photocell 33 and which is then coupled via amplifier 45 to a di-phase to binary receiver 47 comprised of a Signetics 8T20 bi-directional one-shot circuit 49, conditioned as a frequency doubler, coupled to a Signetics 74121 non-retriggerable one shot circuit 51. A scale of two flip-flops 53 coupled to the other output of the one-shot circuit 49 is adapted to recover the data information. The clock signal recovered is fed to counter 41 by means of a clock stream switch 55. During the read-out or READ mode, a selected sequence of data is read out of the memory array 35 which is fed to a binary to di-phase transmitter 57 comprised of Signetics 8T20 bi-directional one-shot circuit 59 and a scale of two flip-flop circuits 61 only one output Q of which is used as a common output for both data and clock signals. The binary counter 41 controlling the address circuitry 37, however, now operates in response to a clock stream generated by a local clock source 63. This clock stream is coupled through a gate circuit 65 which is controlled by means of the READ/WRITE command button 43. The command button 43 is operable in the READ mode to turn on the gate 65 so as to couple the clock 63 to the one shot circuit 59 which is operable in combination with the flip-flop 61 to transmit both data and clock signals to a light emitting diode 67 via amplifier 69. The binary counter 41, moreover, is coupled back to the gate 65 which is adapted to be gated off thereby when the last bit of a particular data sequence is outputted from the array 35. Thus, it is obvious that the clock stream switch 62 is in a first position during the WRITE mode but in an opposite position during the READ mode.

If, for example, it is desired to store a series of telephone numbers in the RAM array 35, it should be noted that a self-dialed distance telephone number is eleven digits in length. Since a count up to ten for each digit may be represented it is necessary to assign four bits of data per digit. Thus, for an eleven digit phone number, forty-four storage cells would be required for each number. If 100 eleven digit phone numbers were to be stored in the array 44, the memory would be required to store 4400 bits of information and, accordingly, include 4400 memory cells. In order to enter or retrieve the individual telephone numbers, the manual address selector 39 selects one group of eleven digits out of the possible 100, whereas the binary counter 41 acts to sequentially access the memory positions one through eleven within the group selected. When desirable, however, any addressing scheme may be resorted to to satisfy a particular access requirement.

Accordingly, in the READ mode, the light emitting diode 67 shown in FIG. 3A provides light modulated pulses of data and clock signals, respectively, from the circuitry shown in FIG. 3A. These pulses are adapted to be fed to the single channel receiver device 15 which is shown in greater detail in FIG. 4A. There a photocell 71 is adapted to be responsive to the output from the light emitting diode 67. The photocell 71 generates electrical signals corresponding to data and clock pulses which are coupled to pulse amplifier 73 whose output is fed to a di-phase to binary receiver 75 substantially the same as that shown in FIG. 3A. The receiver 75 recovers and outputs separate data and clock signals therefrom. Buffer memory 77 temporarily stores the data fed thereto from the portable RAM device 10 in response to the clock signals and then feeds its contents to a data converter 79 for example, a digital to analog converter whose output is coupled to an output data line 81 which may be, for example, a telephone line adapted to dial a remote telephone set.

Referring now to the dual channel system and more particularly to FIG. 1B a dual channel portable RAM 10 is also incorporated, for example, in the casing of an electronic watch, not shown. The RAM has data loaded into it by means of a dual channel programming device 12 which is adapted to receive input data (analog or digital) which is then transferred in digital form to the RAM 10 via separate data channel 14 and a clock channel 16 which respectively couple data and clock signals to the RAM, the latter signals being used to provide a time base for the loading operation. In a like manner, the contents of the portable RAM 10 is selectively read out to a dual channel receiver device 18 through a separate data channel 20 and a clock channel 22. The receiver device 18 is adapted to accept the data read out from the portable RAM 10 and transform or decode the data in a suitable fashion for an external utilization device.

The programming device 12 and the receiver device 18 are located on a common piece of apparatus, such as a telephone set, and bi-directional data transfer is readily achievable by placing the portable RAM 10 in registration with the programming device 12 whereupon the data and clock channels 14 and 16 are established for loading the RAM with selected data. The RAM is then disengaged from the programming device 12 and at some desired later time is again placed in registration with the receiver device 18 whereupon the data and clock channels 20 and 22 are established and selected data read out from the RAM 10 to the receiver 18.

The pairs of data and clock channels of this embodiment are also implemented by respective optical frequency means such as light emitting semiconductor diodes optically coupled to light responsive means such as semiconductor photocells.

In greater detail, attention is now directed to FIGS. 2B, 3B and 4B. FIG. 2B more specifically illustrates the programming device 12 shown in FIG. 1B. Accordingly, an input data line 24 which is adapted to carry, for example, analog data, is fed to a data converter 26 which is adapted to transform the analog input data into binary digital form which is then fed to a buffer memory 28, a well known device, under the control of a clock source 30 which is adapted to provide timing signals for the buffer memory 28 as well as feeding timing signals to a light emitting diode 32 through an amplifier 34 to implement the clock channel 16 shown in FIG. 1B. The timing or clock signals applied to the light emitting diode 32 modulate the light output from the diode to provide a series of light pulses which are adapted to be coupled to a photocell 36 shown in FIG. 3B when the portable RAM 10 is in registration with the programming device 12 shown in FIG. 1B. The content of the buffer memory 28 is fed out to a second light emitting diode 38 via the amplifier 40 to implement the data channel 14 as shown in FIG. 1. The data content fed to light emitting diode 38 is adapted to be coupled to the photocell 42 shown in FIG. 3B.

Referring not to FIG. 3B, reference numeral 44 designates a random access memory array substantially the same as shown with reference to memory 35 shown in FIG. 3A. Associated with the array 44 is suitable address circuitry 50 which enables any one of the plurality of storage cells in the array 44 to be addressed in accordance with manual address selector means 52. Memory locations are likewise accessed in timed sequence by means of the output of a binary counter 54 which operates in response to a clock signal stream. In the read-in or WRITE mode, as directed by READ/WRITE command means 56, the clock stream is developed from the input clock pulses directed to the photocell 36 and which is then coupled to the counter 54 by means of an amplifier 58, a data line 60 and a clock stream switch 62.

During the read-out or READ mode, a selected sequence of data is read out of the array 44 over the data line 48 which is fed to a light emitting diode 64 via a pulse amplifier 66. The binary counter 54 controlling the address circuitry 50, however, operates in response to a clock stream generated by a local clock source 68. This clock stream is coupled through a gate circuit 70 which is controlled by means of the READ/WRITE command means 56. More particularly, the command means 56 is operable in the READ mode to turn on the gate 70 so as to couple the clock 68 to the clock stream switch 62 as well as to a light emitting diode 72 after first being amplified by the pulse amplifier 74. It should be pointed out that loading and unloading of the RAM 44 can be accomplished at different clock speeds as long as the data and clock signals are in "sync", i.e. synchronized. The binary counter 54, moreover, is coupled back to the gate 70 which is adapted to be gated off thereby when the last bit of that data sequence is outputted from the array 44. Thus, it is obvious that the clock stream switch 62 is in a first position during the WRITE mode but in an opposite position during the READ mode.

Accordingly, in the READ mode, the light emitting diodes 64 and 72 shown in FIG. 3B provide modulated pulses of data and clock signals, respectively, from the circuitry shown in FIG. 3B. These pulses are adapted to be fed to the receiver device 18 which is shown in greater detail in FIG. 4B. There a photocell 76 is adapted to be responsive to the output from the light emitting diode 64 (FIG. 3B) while the photocell 78 is adapted to be responsive from the clock signal pulses from the light emitting diode 72 (FIG. 3B). The photocells 76 and 78 generate electrical signals corresponding to data and clock pulses which are coupled to pulse amplifiers 80 and 82 whose outputs are fed to a buffer memory 84 via data lines 86 and 88, respectively. The buffer memory 84 is adapted to temporarily store the data fed thereto from the portable RAM device 44 in FIG. 3B and then feed its contents to a data converter 88, for example, a digital to analog converter whose output is coupled to an output data line 90 which may be, for example, a telephone line adapted to dial a remote telephone set or a telephone line adapted to send or receive a data stream.

Figure 5B:
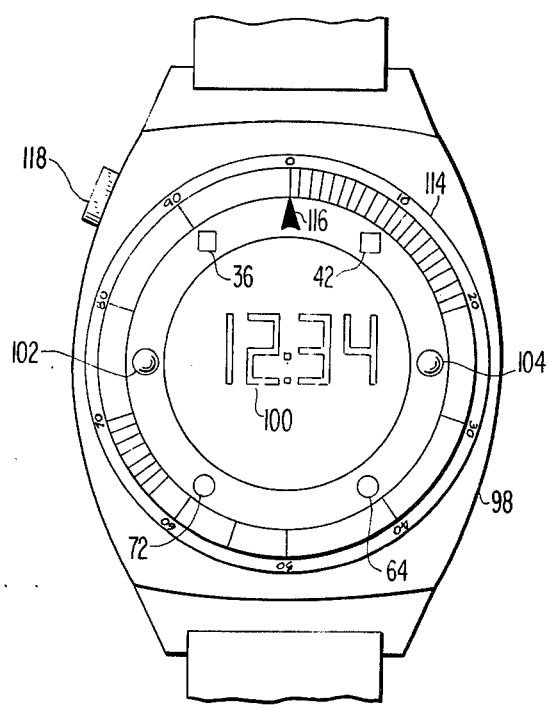
FIGS. 5B and 5B-B are plan views being further illustrative of the wristwatch shown in FIGS. 5A and 5A-A, respectively.

In order to more fully understand the subject invention as it pertains to a telephone dialing system, reference is now made to FIGS. 5A and 5B wherein there is shown a telephone set comprises of a dialer 92 and a handset 94 as well as a dual channel portable device 96 which may be, for example, an electronic wristwatch within which said RAM 44 shown in FIG. 3B is located. The watch has a casing 98 which includes a visual display portion 100 which is adapted to additionally provide a visual indication of alpha/numeric data, either read into or read out of the device RAM 44. Where, for example, the device 96 actually comprises a wristwatch, time would also be visually displayed in digital form.

The RAM circuitry shown in FIG. 3B is fabricated on one or more integrated circuit chips by techniques presently available to those skilled in the art and incorporated within the casing 98; however, the casing is modified to include the input photocells 36 and 42 along one outer edge portion of the face of the casing adjacent the display portion 100 while the output light emitting diodes 64 and 72 are located on an opposite edge portion of the casing. The face portion of the device 96 is adapted to be placed into registration with a programming device 12 and a receiver device 18. Accordingly, alignment means such as a pair of raised bumps 102 and 104 or other male-type mating means is included on the side portion of the face of the casing 98, being adapted to be placed in registration with an assembly 106 located on the ear piece portion 108 of the handset 94. When desirable, the assembly may be located on the mouth piece portion 109. The assembly 106 includes female type alignment means comprising a pair of dimples or recesses 110 and 112 which are adapted to register with the raised bumps 102 and 104 on the casing. The assembly 106 includes the pair of light emitting diodes 32 and 38 referenced in FIG. 2B for being optically coupled to the respective photocells 36 and 42 of FIG. 3B as well as the pair of photocells 76 and 78 shown in FIG. 4B which are adapted to be coupled to the light emitting diodes 64 and 72 of FIG. 3B. The telephone handset 94, moreover, is adapted to include within its recesses electronic programming means and receiver means in a manner broadly disclosed with respect to FIGS. 2 and 4.

Referring now briefly to FIG. 5B, this figure is additionally intended to illustrate the inclusion of means intended to illustrate the manual address selector 52 and the READ/WRITE command means 56 shown in FIG. 3B. In the embodiment shown, the address selector 52 takes the form of an outer concentric ring 114 having indicia, for example, 0-100 index marks as shown, which are adapted to be manually aligned with a reference marking 116 on the face of the casing 98. Thus, by rotation of the ring 114, 100 separate detent positions can be selected which positions are adapted to select a group of digits stored in the random access memory array 44. Additionally, a mechanical slide switch 118 is mounted on the side of the casing 98 having one manual position which is adapted to select the WRITE mode of operation wherein data and clock signals are respectively coupled to the photocells 42 and 36 but being adapted to be moved to a second manual position for selecting the READ mode of operation whereupon output data and clock signals are respectively provided at the light emitting diodes 64 and 72.

Thus, what has been shown thus far is a single and dual channel system of a portable digital random access memory contained, for example, in a device such as an electronic wristwatch which is adapted to be placed in registration with an optical coupling assembly attached to either the earpiece or mouthpiece of a telephone handset, with the programming circuitry and the receiver circuitry being included within the handset.

Such a system, for example, is adapted for use whereby a repertory of telephone numbers or other information (alphanumeric) can be loaded into the memory array shown in FIGS. 3A and 3B either through the dialing means (mechanical or "Touchtone") of a local telephone set or can be loaded from a remote telephone set through the telephone line 120 shown in FIG. 5A. Following the programming of the telephone numbers into the RAM memory array 44 contained in the portable device 96 it can subsequently be put into registration with the assembly 106 whereupon the receiver circuitry contained in the handset 94 is activated and an automatic dialing of a remote telephone effected. Since both mechanical and "Touchtone" telephone dialing systems are both commonly in use today, FIGS. 6A and 6B through 10 are provided to show operation of the subject invention in connection with a "Touchtone" system whereas FIGS. 11 through 13 disclose the subject invention in connection with a mechanical telephone dialer system.

Figure 6A:
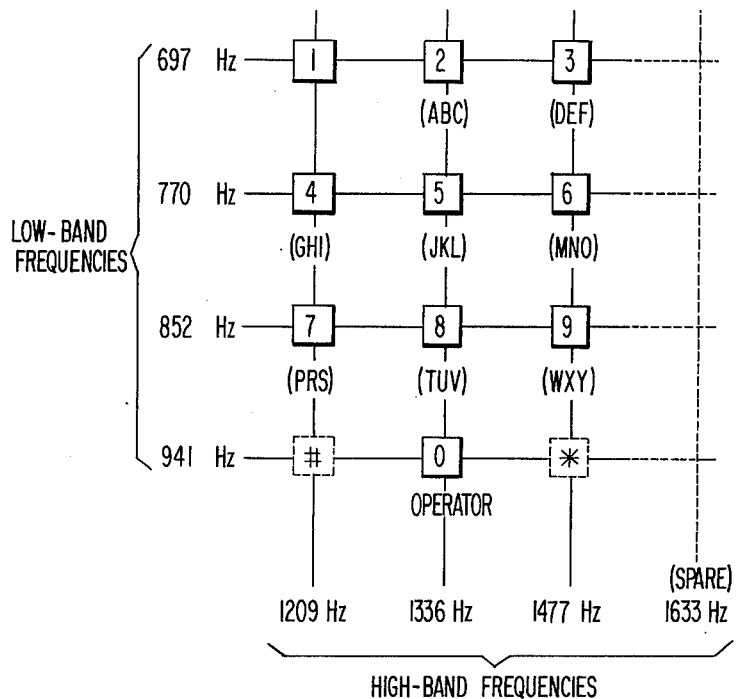
FIG. 6A is a diagram illustrating the pushbutton dialing frequencies associated with a "Touchtone" telephone set.

Directing attention now to FIG. 6A, there is schematically shown a pushbutton faceplate including four rows and four columns of telephone "Touchtone" pushbuttons. Inductor-capacitor (LC) resonant circuits, not shown, generate the required tone frequencies associated with each pushbutton. In a "Touchtone" telephone set, pressing a pushbutton causes the rotation of two rods. One rod is associated with a row of pushbuttons and the other with a column. The pushbutton that is pressed determines which pair of rods will be rotated, resulting in the generation of two audio tones.

Figure 6B:
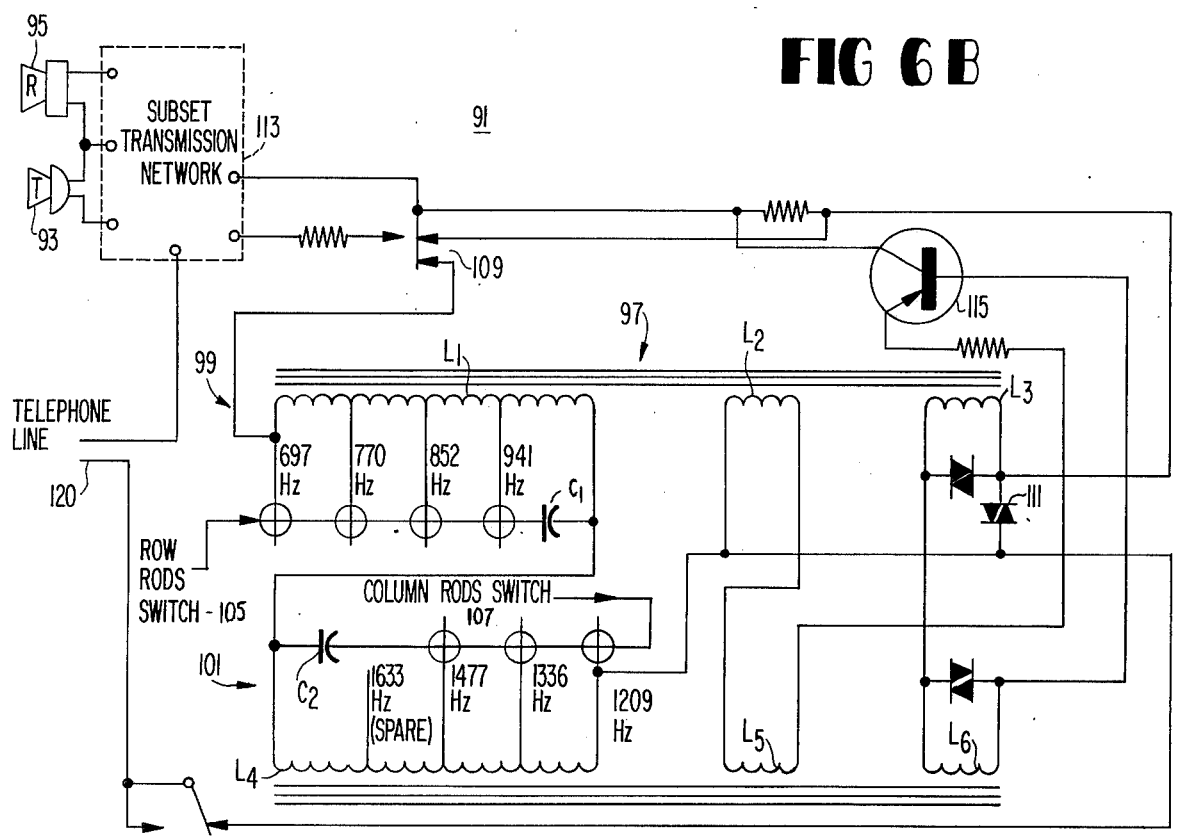
FIG. 6B is an electrical schematic diagram illustrative of a pushbutton dialing telephone set.

In a typical pushbutton dialing type telephone set 91 as shown in FIG. 6B and having transmitter and receiver means 93 and 95, the frequency generation unit 97 includes two tuned circuits 99 and 101, each circuit of which consists of an induction coil which has three windings and a capacitor. The windings are designated $L_1, L_2 \ldots L_6$. Capacitor $C_1$ is associated with winding $L_1$ and $C_2$ is associated with $L_4$. Taps on coil $L_1$ are connected to four respective rods, not shown, linked with the rows of pushbuttons. The tune circuit of $L_1$ and $C_1$ controls the generation of the lowband frequencies 697Hz, 770Hz, 852Hz and 941Hz. Similarly, taps on coil $L_4$ are associated with three respective rods, not shown, linked with the columns of pushbuttons. $L_4$ and $C_4$ form the tuned circuit to produce the highband range of frequencies 1209Hz, 1336Hz and 1477Hz.

The operation of any pushbutton activities sets of contacts on three switches 105, 107 and 109. One set of contacts on switch 105 is connected with each rod of the rows of pushbuttons. The contacts of switch 107 connect to the rods linked with the columns. Switch 109 is common to all pushbuttons and is activated only during the latter part of the sequence of events. In the normal position of switch 109 most of the current drawn by the transmitter 93 will flow through varistor 111. Some current will also pass through windings $L_1$ and $L_4$.

Assume that pushbutton for the digit "2 (ABC)" is pressed. The rod linked with the first row will close the contacts of switch 105. At the same time the rod of the second column will close the contacts of switch 107. Activation of the contacts of switch 105 connect capacitor $C_1$ to the first tap on winding $L_1$. Similarly, the operation of switch 107 connects capacitor $C_2$ to the second tap on winding $L_4$, establishing the tuned or resonant circuits for producing the 697 and 1336Hz frequencies. These frequencies correspond to the pressed digit 2(ABC) but the tone signals have not yet been generated by the action of switch 109.

Not until the pushbutton is pressed all the way down does switch 109 operate, interrupting the direct current flowing through windings $L_1$ and $L_4$, causing shock excitation of the two tuned circuits and thereby generating the 697 and 1336Hz frequencies. At the same time, the central office battery voltage on the subscriber's line 120 will be connected to transistor 115 sustaining the 697 and 1136Hz oscillations. The speech circuit 113 in the telephone set will be shunted by the action of switch 109 but the subscriber will be able to hear the outgoing tone signals at a low level.

Figure 7:
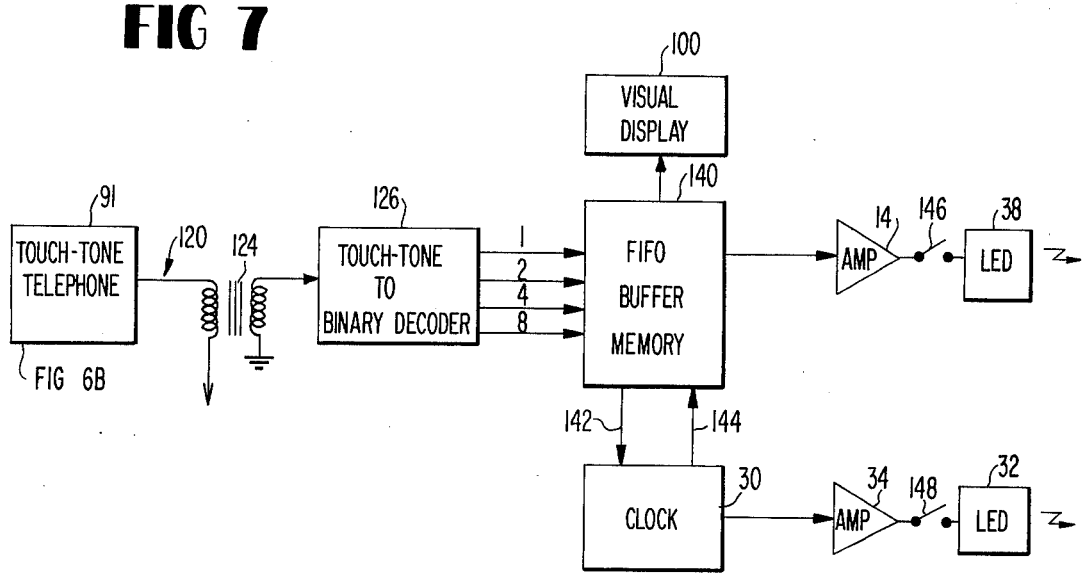
FIG. 7 is an electrical block diagram illustrative of a programming device utilized in connection with a "Touchtone" telephone system.

Referring now to FIG. 7, there is disclosed in electronic block diagrammatic form programming means 12 for a "Touchtone" telephone dialing system. A "Touchtone" telephone set 91 such as shown for example in FIG. 6B is connected to the telephone line 120. Intermediate the "Touchtone" telephone set 91 and the telephone line 120 is inserted an audio transformer 124 which is adapted to couple "Touchtone" dialing signals from the set 91 or incoming dialing signals appearing on the telephone line 120 to a "Touchtone" to binary digital decoder 126 which corresponds to the data converter 26 shown in FIG. 2B. The converter 126 is shown in greater detail in FIG. 8 and comprises a "Touchtone" decoder circuit 128 coupled to a diode matrix 130 which is adapted to take the 1 through 12 numerical outputs of the decoder 128 and provide four binary outputs corresponding to the numbers 1, 2, 4 and 8 on the data lines 132, 134, 136 and 138, respectively.

The decoder circuitry 128 is well known and can be purchased as an "off the shelf" integrated circuit module. A Signetics, Inc. type SE/NE 567 linear integrated circuit module is a typical illustrative example of such a decoder. The binary output for each digit dialed of the "Touchtone" to binary converter 126 is fed in parallel fashion to a first-in, first-out (FIFO) buffer memory 140 comprising a data register which corresponds to the buffer memory 28 shown in FIG. 2B. A first-in first-out data register (buffer memory) is a well known device, a typical example of which is a Fairchild type 9403 integrated circuit module of its TTL Macrologic Product line. The data is clocked out of the register 140 in serial format by means of the clock 30 (FIG. 2B) and is operative such that when the data for each digit dialed has been entered into the register 140 a gate signal is applied from the output port of the register via signal line 142 which turns on the clock 30 which operates to couple clock signals back via signal line 144 to the register 140 which unloads its data in serial fashion to the light emitting diode 38 via amplifier 14. While the clock 30 is operative, clock signals are simultaneously fed to the light emitting diode 32 via pulse amplifier 34 in the manner described with respect to FIG. 2B. The configuration shown in FIG. 7 additionally includes a pair of normally open mechanically operated proximity switches 146 and 148 which are adapted to be closed during a programming operation whereupon the light emitting diodes 32 and 38 are connected to the respective amplifiers 34 and 14. The switches 146 and 148 are adapted to be closed when the portable device 96 including the circuitry shown in FIG. 3B is placed into registration with the optical coupling assembly 106 on the earpiece of the telephone handset 94. These switches comprise pressure actuated proximity switches positioned behind the dimples or recesses 108 and 112. Thus digital data corresponding to a telephone number is sequentially coupled to the RAM array 44 via the light emitting diode 38 together with the clock pulses from the light emitting diode 32.

Figure 9:
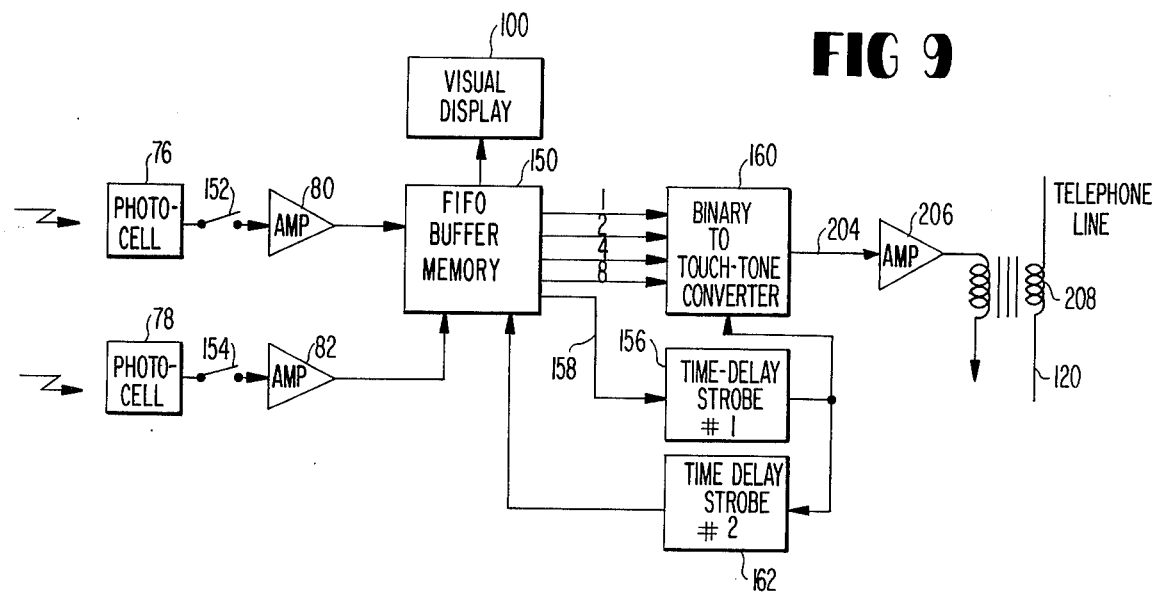
FIG. 9 is an electrical block diagram illustrative of a receiver device utilized in combination with a "Touchtone" telephone system.
Figure 10:
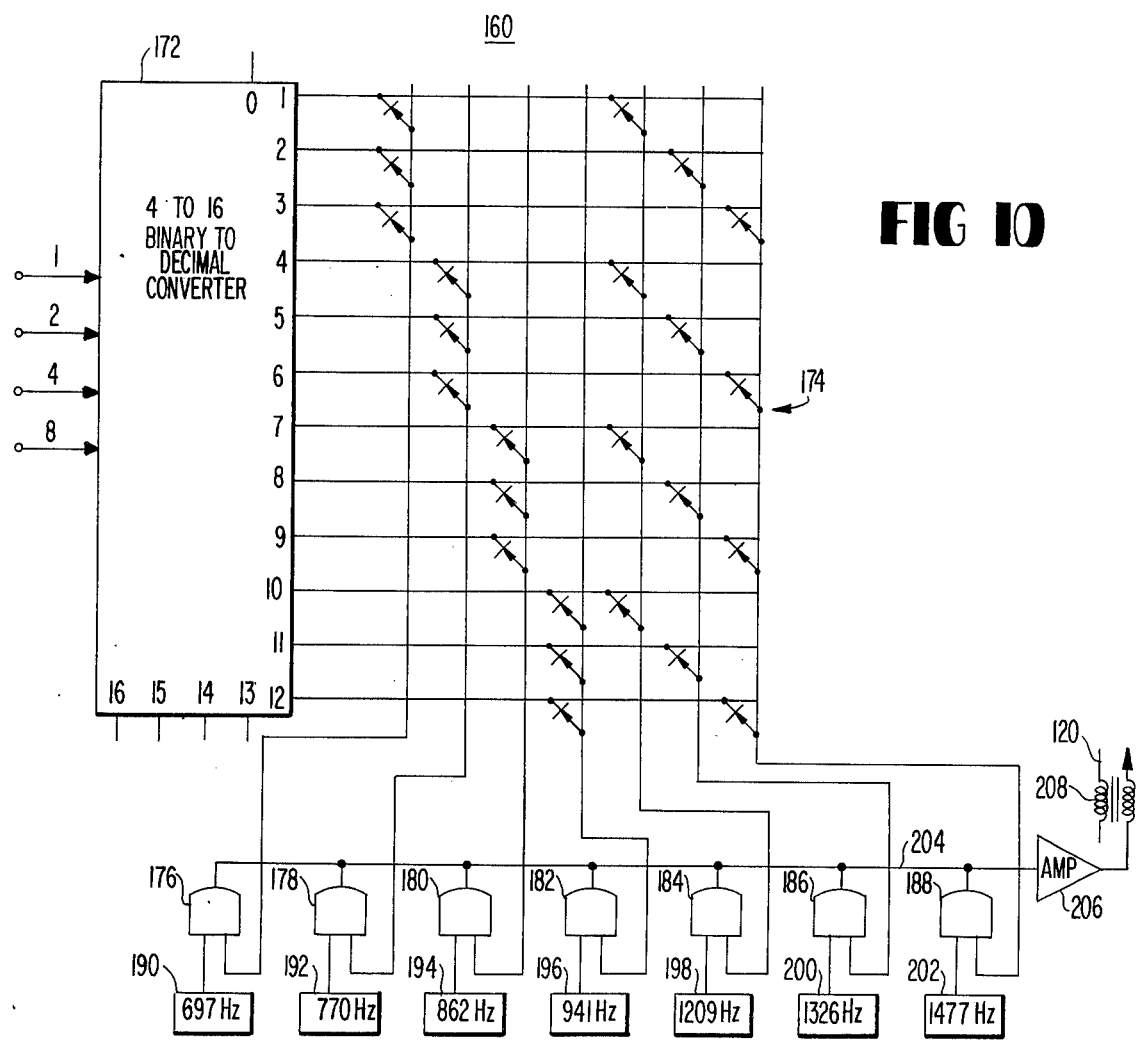
FIG. 10 is an electrical schematic diagram illustrative of the binary to "Touchtone" decoder apparatus shown in FIG. 9.

Reference is now made to FIGS. 9 and 10 in order to illustrate the manner in which a portable device 96 including the circuitry shown in FIG. 3B when loaded with a repertory of telephone numbers can be utilized to automatically dial a remote telephone by means of "Touchtone" type audio signals coupled to the telephone line 120 (FIG. 5A). When the portable device 96 is placed into registration with assembly 106 the photocells 76 and 78 are optically coupled to the light emitting diodes 64 and 72. Data pulses corresponding to a telephone number and clock pulse signals are respectively fed to a second first-in first-out (FIFO) buffer memory 150 comprising a data register which is adapted to be loaded by a serial input for each digit to be dialed and providing a parallel output. The data input is coupled to the data register 150 through the pulse amplifier 80 (FIG. 4B) while the clock pulses are fed thereto through pulse amplifier 82. As in the programming configuration shown in FIG. 7, the receiver configuration shown in FIG. 9 also includes a pair of normally open proximity switches 152 and 154 coupled between the photocells 76 and 78 to the respective amplifiers 80 and 82. The switches 152 and 154 are adapted to be closed when the portable device 96 is placed in registration with apparatus such as shown in FIG. 5A and may, when desired, by comprised of pressure actuated proximity switches located adjacent the dimples 108 and 112. When the buffer memory 150 is loaded with a digit, a signal is coupled from a "register full" port to a strobe circuit 156 via circuit lead 158 which acts to strobe a binary to "Touchtone" converter 160 which corresponds to the data converter 89 shown in FIG. 4B. A second strobe circuit 162 is coupled to the output of the strobe circuit 156 to clock the register 150 so that it can present a new type or character of data i.e., to the binary to "Touchtone" converter for impinging upon the telephone line.

Figure 8:
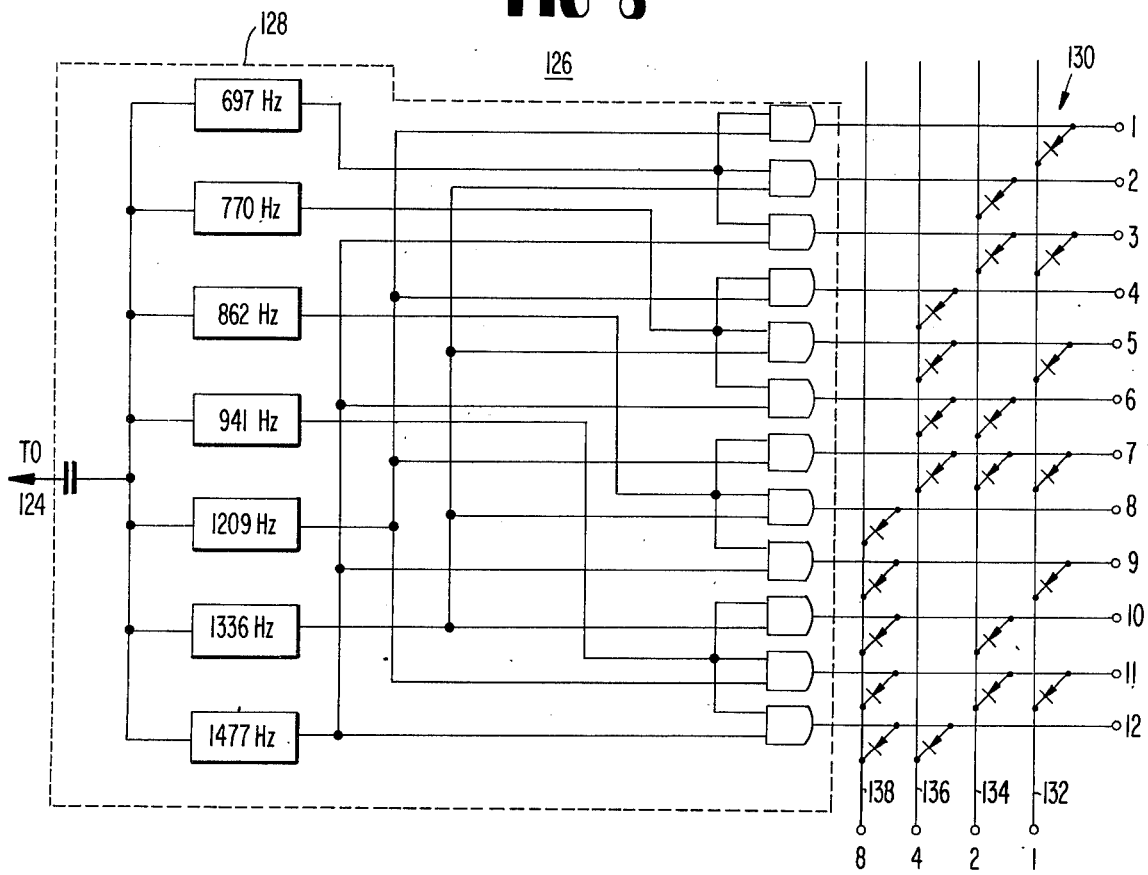
FIG. 8 is an electrical schematic diagram illustrative of "Touchtone" to binary decoder apparatus shown in FIG. 7.

The details of the binary to "Touchtone" converter circuit 160 is shown in FIG. 10 and is essentially the converse of the decoder 126 shown in FIG. 8. Four binary bits corresponding to 1, 2, 4 and 8 are coupled in parallel by way of data lines 164, 166, 168 and 170 to a binary to decimal decoder circuit 172 which is adapted to provide twelve output lines for the numbers 1, 2, 3 . . . 12. The decoder circuit 172 is a well known device, an example of which is a Fairchild Type 74154 solid state circuit module. The twelve output lines are coupled to a diode matrix 174 which in turn is coupled to seven gatable analog switches 176, 178 . . . 188 typically RCA type 4016 analog gates having a respective tone generator 190, 192 . . . 202 coupled thereto. The tone generators 190 . . . 202 are adapted to generate the "Touchtone" audio frequencies of 697Hz through 1477Hz. A sequence of dialing tones are outputted onto a common output line 204 in response to each digit loaded into the register 150. These dialing tones are coupled to an audio signal amplifier 206 whose output is coupled to an audio transformer 208. The secondary winding of transformer 208 is coupled into the telephone line 120 and accordingly a remote telephone set is automatically dialed.

Figure 11:
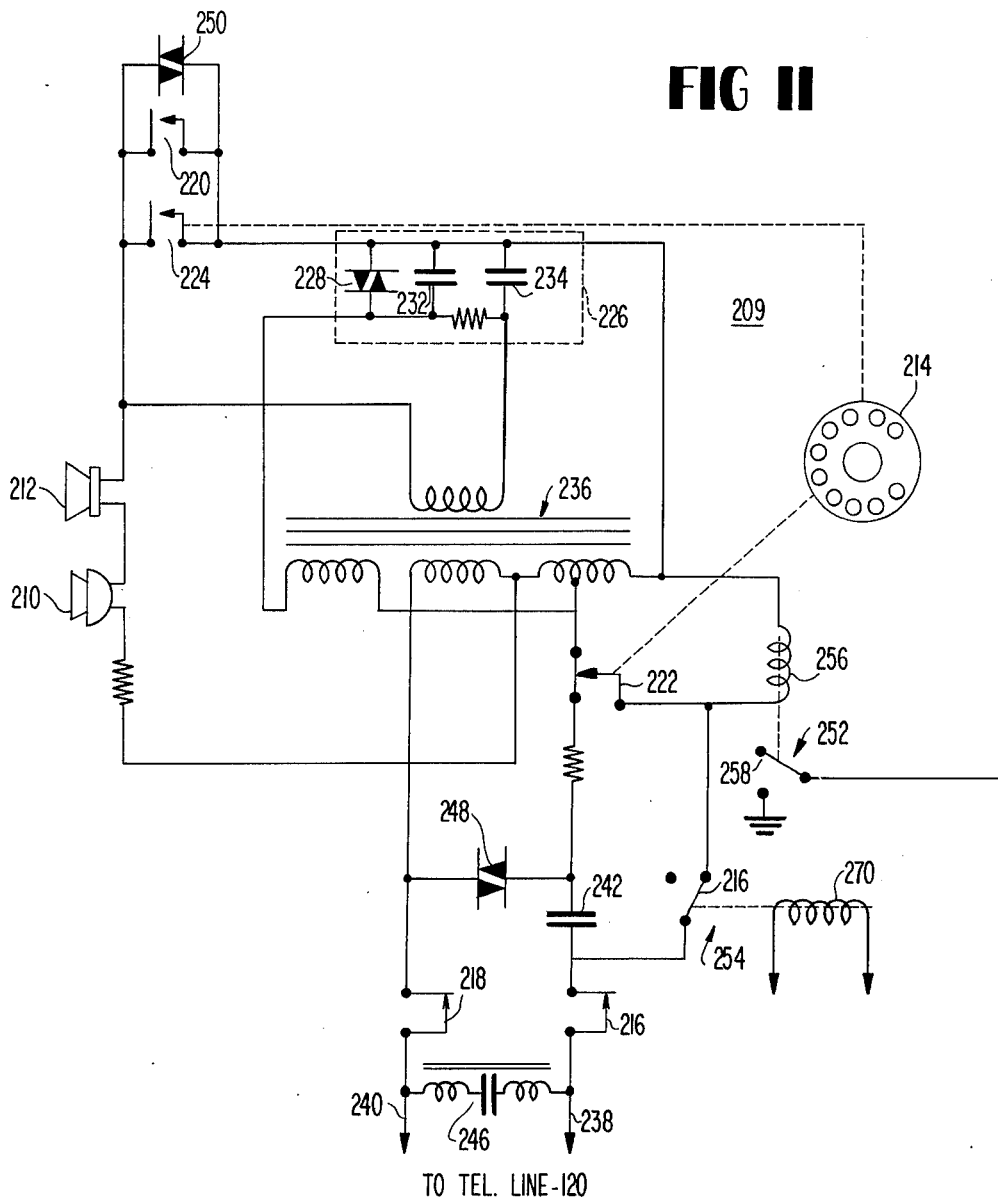
FIG. 11 is an electrical schematic diagram illustrative of a mechanical dialer type of telephone set adapted for operation in connection with the subject invention.

As noted above, the subject invention also contemplates loading of the portable device 96 including the RAM circuitry by means of a mechanical dialer type telephone set as well as automatically dialing a like telephone set situated at a remote location. FIG. 11 discloses an elementary schematic of a typical contemporary type of mechanical dialer telephone set 209 having transmitter and receiver means 210 and 212 as well as a mechanical rotary type dialer mechanism 214. Three sets of switch contacts 216, 218 and 220 are components of the switch hook, not shown, and are shown in the off-hook position. Two additional pairs of switch contacts 222 and 224 are mechanically coupled to the dialer 214 and are shown in the normal unoperated state. When the dialer 214, for example, is rotated to the digit "4", and then released, the contacts 222 will be opened and closed four times as the dialer 214 returns to its normal position. Switch contacts 224 at the same time are closed to short circuit the receiver means 212 to prevent the dialing "clicks" from being heard. A balancing network 226 comprised of varistor 228, resistor 230 and capacitors 232 and 234 operate in combination with the windings of the induction coil 236 to form a hybrid arrangement which provides full duplex operation over a two wire circuit including telephone lines 238 and 240. Capacitor 242 and resistor 244 make up a dial pulse filter to suppress high frequency interference to nearby radio receivers. A ringer circuit 246 coupled across the lines 238 and 240 is also illustrated. Varistors 248 and 250 are additionally shown and are utilized for suppressing dial "clicks" in the receiver. FIG. 11 is shown additionally including two electromagnetic relays 252 and 254 which are adapted to load the portable device 96 including RAM circuitry shown in FIG. 3 and dial a remote telephone set, respectively, in conjunction with the apparatus shown in FIGS. 12 and 13.

Figure 12:
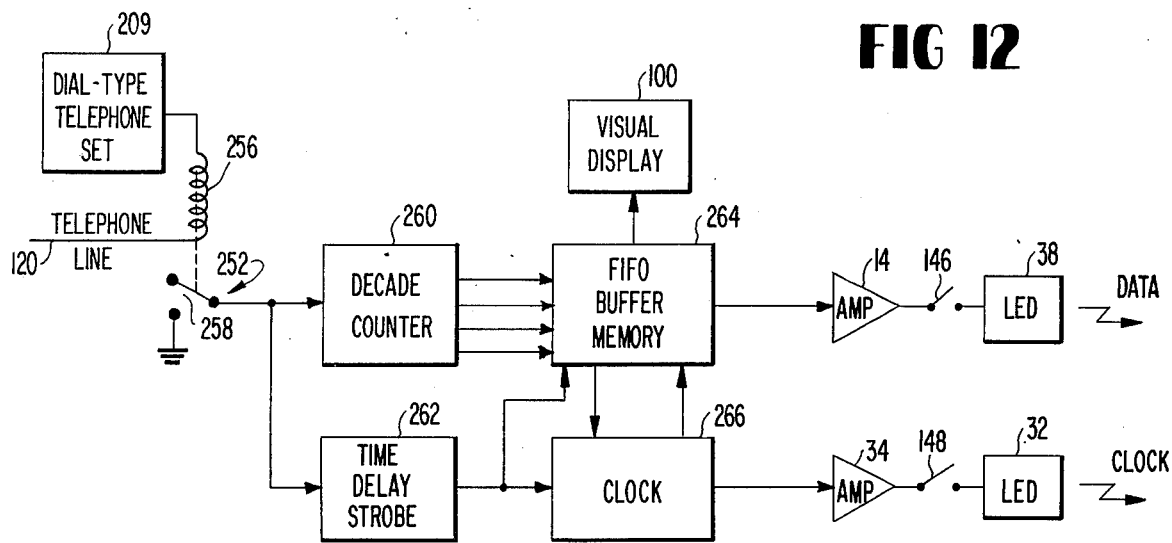
FIG. 12 is an electrical block diagram illustrative of a programming device utilized in connection with a mechanical dialer type telephone set.

Referring now to FIG. 12, the dialer contacts 222 (FIG. 11) are adapted to control the energization of relay coil 256 of relay 252. Accordingly, the relay contacts 258 will operate in step with the opening and closing of the dialer contacts 222 and thus provide "click" signals in response to a number dialed by manual manipulation of the rotary dialer mechanism 214. A decade counter 260 has its input connected to the relay contacts 258 and is thus able to count the dial pulse "clicks" for a particular digit dialed. For a particular digit dialed, a strobe circuit 262 strobes a first-in first-out (FIFO) buffer memory 264 comprising a data register coupled to the decade counter 260 which rearranges data fed in parallel from the counter to a serial data stream in response to a clock 266 in a manner already described. The data stream from the FIFO memory 264 is coupled to light emitting diode 38 (FIG. 2B) through the amplifier 14 while the clock stream is simultaneously fed to the light emitting diode 32 (FIG. 2B) by means of the amplifier 34. As in the case for the "Touchtone" programming scheme shown in FIG. 7, the proximity switches 146 and 148 are included for rendering the output circuitry operative only when the portable device 96 is placed in registration with the programming circuitry as shown with respect to FIG. 5A.

Figure 13:
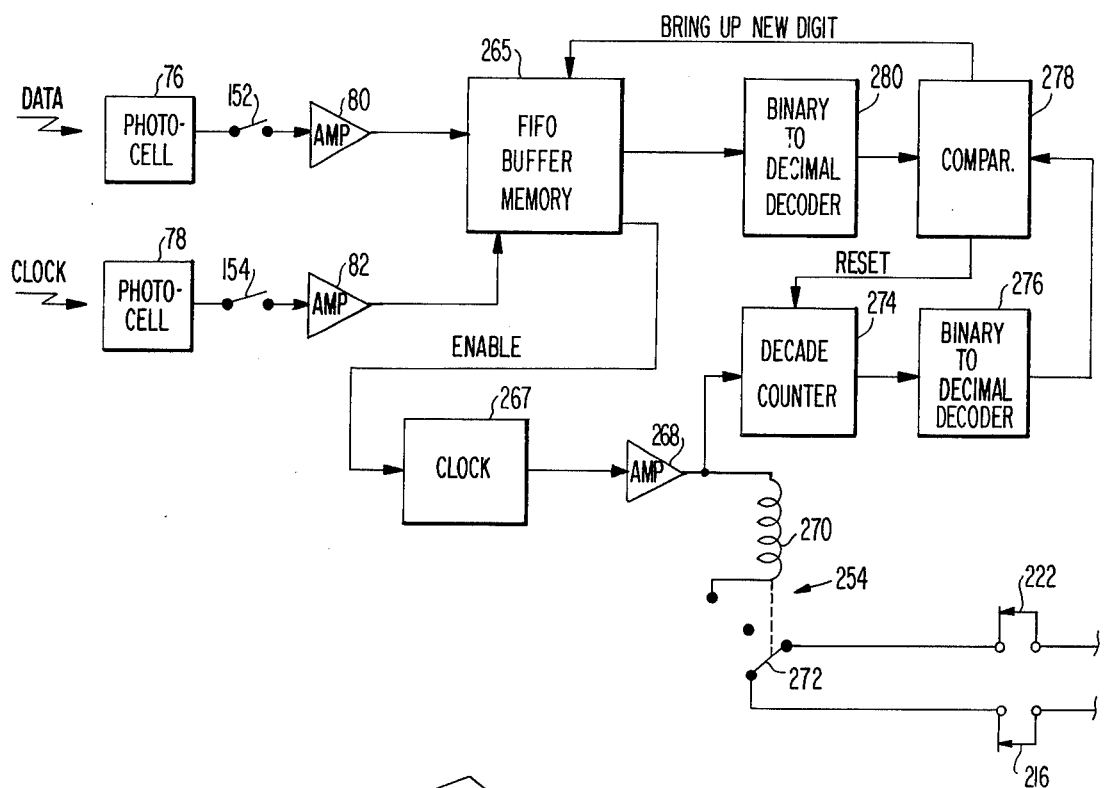
FIG. 13 is an electrical block diagram illustrative of a receiver device utilized in connection with a mechanical dialer telephone set.

Insofar as automatic dialing is concerned, the configuration shown in FIG. 13 is utilized wherein telephone dialing data and a clock pulse stream is optically coupled to the photocells 76 and 78 from the portable device 96 which are applied to a first-in first-out (FIFO) buffer memory 265 comprising a data register which is adapted to receive a serial data stream from the photocell 76 through the pulse amplifier 80 and the proximity switch 152. The clock pulses are applied to the memory 265 by means of the amplifier 82 and the proximity switch 154 in the manner described above with reference to FIG. 9. Each digit is entered into the memory 265 in serial form and reassembled in parallel form. When a particular digit has been loaded, a "register full" port of the memory 265 activates a clock circuit 267 which sends a series of pulses through an amplifier 268, the output of which is adapted to operate the coil 270 of relay 254 at the same rate a mechanical dialer operates causing relay contacts 272 to produce a telephone dialing sequence. The output of the clock 267 is also simultaneously fed to a decade counter 274. The output of the decade counter 274 is fed in parallel fashion to a binary to decimal decoder 276 whose output is fed to a Texas Instruments type 7485 comparator circuit 278 which receives an input from a binary to decimal decoder 280. Decoder 280 has its input coupled to the parallel output of the memory 265. Operatively, the decade counter 274 continues to count until its count matches the FIFO output number as determined by the comparator 278. When a match occurs, a reset occurs and a signal is outputted from the comparator 278 for the memory 265 to output the next digit. Thus, the process is repeated until all of the parallel data has been emptied from the FIFO 265 and the complete phone number has been dialed.

The apparatus disclosed in FIG. 13, moreover, is all comprised of well known solid state circuit modules which constitute present day "off the shelf" items. The data register comprising the FIFO buffer memory 265 constitutes a Fairchild Type 9403 buffer memory, noted above, The two binary-to-decimal decoders 276 and 280 are comprised of Fairchild Type 7442 integrated circuit devices while the decade counter 274 comprises a Fairchild Type 7490 integrated circuit device.

It is to be noted that in both the "Touchtone" and the mechanical dialer embodiments, with respect to the programming devices shown in FIGS. 7 and 12, both buffer memories 140 and 265 are shown coupled to a visual display 100. This display, when desirable, can be provided by the digital readout of the wristwatch type of portable device 96. The same can be said for the receiver configuration shown in FIGS. 9 and 13.

Figure 14:
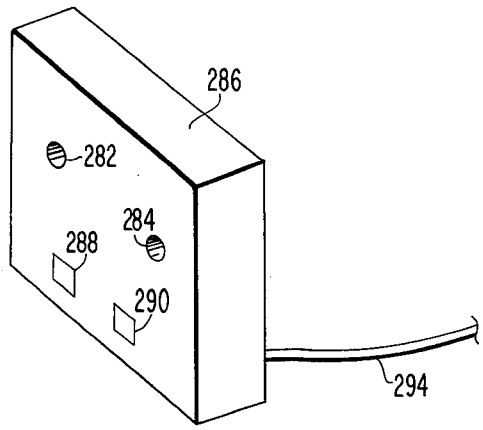
FIG. 14 is a pictorial representation of a receiver device adapted for use in connection with an electrically operated lock mechanism.
Figure 15:
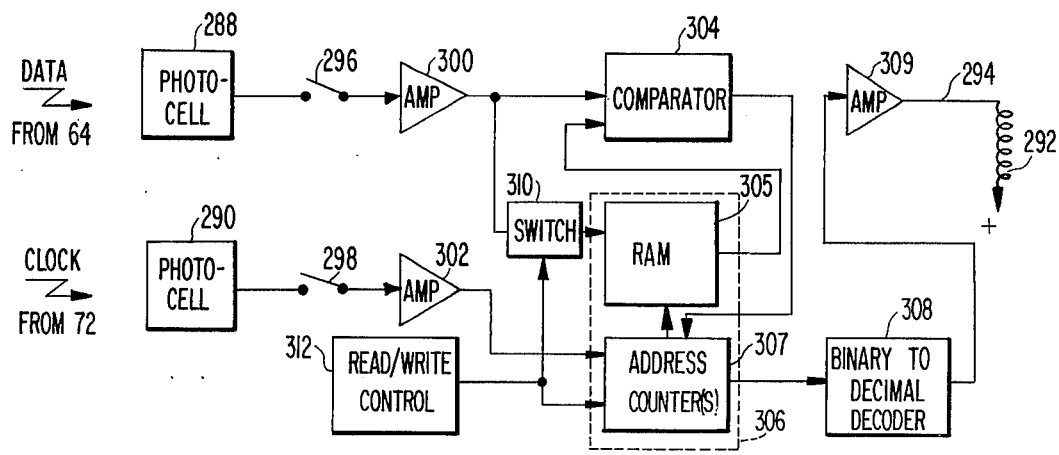
FIG. 15 is an electrical block diagram being further illustrative of the receiver device shown in FIG. 14.

In order to further illustrate the versatility of the subject invention, reference is now made to FIGS. 14 and 15 where there is disclosed means for automatically operating a device such as a door lock or safe. The specific lock combination would be entered into the portable device 96 including the RAM circuitry shown more particularly in FIG. 3 by means of telephone apparatus described above or an equivalent structure. The portable device 96 would then be placed in registration with a pair of recesses or dimples 282 and 284 included on a housing 286 having a pair of photocells 288 and 290 which are adapted via optical coupling to receive the output data stream and clock stream from the light emitting diodes 64 and 72 (FIG. 3B).

Referring now to FIG. 15 there is disclosed in block diagrammatic form the circuitry included within the housing 286 for operating a latch or other device, for example, controlled by a solenoid 292 coupled to the housing 286 by means of electrical wiring 294. The circuitry shown in FIG. 15 includes, inter alia, a pair of proximity switches 296 and 298 which are adapted to be closed when the portable RAM device 96 is placed in registration with the recesses 282 and 284, in a manner previously discussed with regard to the foregoing embodiments. Closure of the switches 296 and 298 couple a data stream to a Type 7485 comparator circuit 304 while the clock stream is coupled to a Read Only Memory (ROM) 306. A ROM is a well known type of integrated circuit implementable in a various number of ways one of which, for example, is by the use of a Fairchild type 34720 RAM 305 coupled to one or more Fairchild type 7493 ROM addressing counters 307. The comparator 304 can be implemented for example by means of a Texas Instrument type 7485 integrated circuit module. The clock stream causes the data corresponding to the lock combination to be coupled to the comparator 304 from the memory 305 simultaneously with the input data stream. If a data mismatch occurs, the output of comparator 304 sends a signal to the address counter(s) 307 which reset to zero. If a match occurs the address counter(s) 307 will reach a specific count which will be sensed by a binary to decimal decoder 308 whose output is amplified by amplifier 309 and coupled to the solenoid 292 which operates to trip the latch. Thus it can be seen that a mismatch will continuously reset the binary address counter(s) 307 and only a match will allow the count to reach a high enough value for the decoder 308 to actuate the solenoid 292. The number of address counters 307 depends on the number of data bits making up the lock combination.

The ROM 306 additionally has associated therewith switch means 310 which is operated in accordance with a control means 312 adapted to control the READ/WRITE mode of Read Only Memory 306. Accordingly, when a combination is to be read into the memory 305 during the WRITE mode, the control means 312 additionally operates switch 30 so that the output of the photocell 288 is coupled to the input of memory 305; however, during the READ mode the switch 310 is opened so that the input data stream from the photocell 288 is only applied to the comparator 304.

Up to this point what has been shown and described is a secific embodiment of the invention wherein the electromagnetic energy input and output communication channel has been implemented by optical energy means consisting of intercoupled light emitting diodes and photocells. This implementation, however, is not meant to be considered in a limiting sense, since when desirable, other electromagnetic energy coupling means may be employed.

To this end reference is now made to the broader concept of the invention. First with reference to FIGS. 1A-A through FIG. 4A-A and more particularly FIG. 1A-A, there is shown a portable RAM device 9' intercoupled with a programming device 11' and a receiver device 15' by means of at least three forms of electromagnetic energy coupling means. The programming device 11' is shown in FIG. 2A-A and is in all respects identical to the embodiment previously described with the exception that the light emitting diode 29 shown in FIG. 2A coupled to the amplifier 31 is more broadly disclosed as an electromagnetic energy source 29' which is coupled to an electromagnetic energy receptor 33' in FIG. 3A-A which is a broader designation for the photocell circuitry 33 shown in FIG. 3A. The output of the portable RAM device 9' as shown in FIG. 3A-A terminates in an electromagnetic energy source 67' which is coupled to the electromagnetic energy receptor 71' of the single channel receiver 15' shown in FIG. 4A-A. While the respective electromagnetic energy sources and receptors shown in FIGS. 2A-A through 4A-A are meant to include the light emitting diode and photocell configurations described above, they are also meant to include other configurations as well, for example, two alternate forms of electromagnetic energy sources are shown in FIGS. 16A and 16B which disclose radio frequency embodiments utilized for radiant energy coupling and inductive coupling, respectively. Similarly, two other forms of electromagnetic energy receptors are shown in FIGS. 17A and 17B which schematically disclose respective radio frequency receiver means utilized for radiant and inductive coupling.

Referring now to FIG. 16A, the transmitter circuitry shown therein is adapted to be but not restricted to be incorporated into a portable casing 96 which may be, for example, the wristwatch 98 such as shown in FIG. 5B-B having a small loop antenna 320 mounted on the face 99 of the watch 98 and which is coupled to a low powered oscillator circuit 322 consisting of a piezoelectric crystal 324 of a predetermined frequency $f_1$ coupled across the base-emitter of transistor 326. The oscillator circuit 322 is made tunable by capacitor 328 and the primary winding 329 of the output transformer 330 and is adapted to be modulated by means of transistor 331 which is adapted to have its base coupled to the output of the amplifier 69 (FIG. 3A-A). The modulated carrier frequency $f_1$ is coupled to the loop antenna 320 through the secondary winding of transformer 330.

The receiver circuit for this embodiment is shown in FIG. 17A and consists of a second small loop antenna 332 also mounted on the face 99 of the watch casing 98. The antenna 332 is coupled to a detector diode 334 through a transformer 336 and tuning capacitor 337. The demodulated signal from the diode 334 is fed through a pair of cascaded amplifier transistors 338 and 340, the output of which is fed to the amplifier 45 coupled to the di-phase to binary receiver circuitry 47 of FIG. 3A-A. The receiver circuit is tuned by means of the variable capacitor 337 to be responsive to a different carrier frequency $f_2$ than the carrier $f_1$ going to the watch. This is illustrated in FIG. 5 and is done to prevent cross talk between the input and output channels.

For electromagnetic energy coupling to a telephone set, the dialer 92, for example as shown in FIG. 5A-A includes a transmitting antenna 342 which is adapted to couple data and clock pulses to the watch's antenna 332 at a carrier frequency $f_2$. For receiving data from the watch 98, a second loop antenna 344 is included on the dialer 32 for receiving data and clock pulses at a carrier frequency $f_1$. As is well known, many forms of modulation e.g. AM, FM, pulse, pulse width and/or phase modulation can be used to transmit and receive this digital information. Thus in the embodiment of the invention shown in FIG. 5A-A, it is not necessary that the watch 98 be placed in registration with the telephone as in the earlier optically coupled embodiment, but it is only necessary that the watch or other type of portable device including the circuitry shown in FIG. 3A-A be placed in close proximity whereupon radiant electromagnetic energy coupling is effected between the portable RAM device 9' and the programming device 11' and receiver device 15' incorporated within the telephone set.

It is also contemplated that while radiant electromagnetic energy coupling is preferred, in some applications it may be desirable to provide coupling by means of near field electromagnetic induction. In such applications, the need for the loop antennas 320 and 332 on the face of the watch 98 and the loop antennas 342 and 344 on the dialer would be eliminated and coupling would be simply effected for example by means of a coil 329' of the transmitter circuit shown in FIG. 16B located on watch face 99 which would be electromagnetically coupled by transformer action to a like coil, not shown, on the telephone apparatus shown in FIG. 5A-A. In a like manner, a coil 335' would be fabricated on the watch casing 98 which would be adapted to be coupled in a near field relationship with a like coil on a telephone dialer 92.

As in the earlier dual channel system disclosed with respect to FIGS. 1B through 4B, the more generalized version of such a system is disclosed in FIGS. 1B-B through FIGS. 4B-B. In the latter embodiment, a dual channel portable RAM device 10' shown in FIG. 3B-B is coupled to a dual channel programming device 12' shown in FIG. 2B-B and a dual channel receiver device 18' shown in FIG. 4B-B. The essential difference between the single channel system and dual channel system is that in the single channel system the clock and data signals are multiplexed whereas in the dual channel system a separate channel is utilized for the data and clock signals. The energy source and receptor means shown in FIGS. 2B-B through 4B-B are identical to those utilized for the single channel system and are typically illustrated in the circuitry shown and described in FIGS. 16A and 16B and 17A and 17B.

Having thus disclosed what is at present considered to be the preferred embodiments of the subject invention, certain other modifications and alterations, not shown, can be resorted to, without departing from the spirit and scope of the invention. For example, electronic digital watches may be set and reset via remote control through use of the portable RAM device. Different length memory configurations may be incorporated within the portable RAM device and may additionally include several random access memory arrays each adapted to perform a different task, e.g. for the purpose of displaying and recording heart rate, blood pressure, body temperature, etc.

The present embodiments are therefore to be considered in all respects as illustrative and not restrictive since the scope of the invention is contained by the appended claims rather than by the foregoing description, and all changes which come within the meaning and range of equivalency of the claims are therefore intended to be embraced therein.

I claim:

1. A bi-directional data transfer and storage system for on-line communication with telephone apparatus wherein selected data from telephone apparatus is first fed to a portable random access memory which subsequently operates on demand to display said data and/or output selected stored data to external means for dialing a telephone and when desirable thereafter communicating data over a telephone channel, the improvement comprising:
a device carried or worn by the user including a casing, said random access memory housed within said casing, said memory having a plurality of selectable memory addresses for storing respective data signals thereat, address circuitry therefor, manual address selector means on said casing coupled to said address circuitry for accessing a desired memory address, at least one optical energy input communications channel coupled to said memory for coupling externally applied alphanumeric data and clock signals thereto for reading selected data signals into a desired address of said memory under the control of said clock signals, an internal source of clock signals and at least one optical energy output communications channel coupled to said memory and said internal source of clock signals for reading out on demand selected data signals from a desired address of said memory and coupling said data signals and said clock signals to said external means.

2. The apparatus as defined by claim 1 wherein said casing comprises a watch type of casing, including means for displaying said data signals.

3. The apparatus as defined by claim 1 and additionally including control means located on said casing coupled to said memory for selecting a READ and WRITE mode of operation of said memory.

4. Apparatus as defined by claim 1 wherein said at least one optical energy input and output communications channel comprises a respective common channel for both data and clock signals.

5. The apparatus as defined by claim 4 and additionally including means coupled to said common input channel and being operable to provide a separate data signal path and clock signal path to said memory and address circuitry respectively.

6. The apparatus as defined by claim 4 and additionally including means coupled to said common output channel and to said memory and an internal source of clock signals and being operable to multiplex data and clock signals into said common output channel.

7. The apparatus as defined by claim 1 wherein said at least one optical energy input channel terminates in light responsive means for receiving both data and clock signals optically inputted thereto and wherein said at least one optical energy output channel terminates in light emitting means for optically coupling both data and clock signals to external utilization means.

8. The apparatus as defined by claim 1 wherein said at least one optical energy input and output communications channel additionally includes a respective additional optical energy input and output communications channel wherein one input and output channel is adapted to carry said data signals while the other input and output channel is adapted to carry said clock signals.

9. The apparatus as defined by claim 8 and additionally including external programming means, including a source of clock signals, registerable with said casing and having two optical energy output communications channels wherein one channel carries data signals and the other channel carries clock signals, said two output channels coupled to said two input channels of said data storage means when in registration with said casing to load selective alpha-numeric data into said memory and apply clock signals to said memory.

10. The apparatus as defined by claim 8 wherein the optical energy input communications channels respectively terminate in first and second light responsive means mounted on said casing for receiving optically coupled input data and clock signals, and wherein the two optical energy input communications channels terminate in respective first and second light emitting means mounted on said casing for optically coupling data and clock signals to external utilization means.

11. The apparatus as defined by claim 10 and additionally including external programming means, including a source of clock signals, registerable with said casing and two optical energy output communications channels, both output channels coupled to said optical energy input channels of said data storage means when in registration with said casing and being respectively terminated in first and second light emitting means for optically transferring data signals and clock signals to the light responsive means terminating the input channels of said data storage means.

12. The apparatus as defined by claim 11 wherein said programming means and said casing include mutual registration means.

13. The apparatus as defined by claim 12 wherein said external programming means is located on a telephone set and additionally includes circuit means for coupling telephone dialing data into the output data channel coupled to the input data channel of said storage means.

14. The apparatus as defined by claim 13 wherein said external programming means includes circuit means for coupling "Touchtone" dialing data to said storage means.

15. The apparatus as defined by claim 13 wherein said external programming means additionally includes circuit means for coupling mechanical telephone dialing data to said storage means.

16. The apparatus as defined by claim 10 and additionally including external receiver means, registerable with said casing and having two optical energy input channels respectively terminating in light responsive means, said light responsive means being coupled to respective light emitting means of said optical energy output channels of said storage means when in registration therewith and being responsive to said data signals and controlled by said clock signals to automatically execute a desired function.

17. The apparatus as defined by claim 16 wherein said external receiver means additionally includes circuit means for dialing a telephone.

18. The apparatus as defined by claim 16 wherein said external receiver means additionally includes circuit means for generating "Touchtone" dialing signals for dialing an external telephone.

19. The apparatus as defined by claim 16 wherein said external receiver means additionally includes means for generating signals for dialing a mechanical dialer type telephone.

20. The apparatus as defined by claim 16 wherein said external receiver means additionally includes circuit means responsive to said data signals for automatically operating a remote control device.

21. The apparatus as defined by claim 8 and additionally including external receiver means registerable with said casing and having two optical energy input communications channels wherein one channel carries data signals and the other channel carries clock signals, said input channels being coupled to said optical energy output channels of said data storage means when in registration therewith and being responsive to said data outputted from said storage means under the control of said clock signals to automatically execute a desired function.

22. The apparatus as defined by claim 1 and additionally including external circuit means operably coupled to said at least one optical energy input and output communications channels to bi-directionally transfer selective alpha-numeric data into and out of said memory.

23. The apparatus as defined by claim 1 and additionally including programming means coupled to a source of alphanumeric data signals, including a source of clock signals, and having at least one optical energy output communications channel coupled to said at least one optical energy input communications channel of said data storage means to load selective alpha-numeric data into said memory and apply clock signals thereto.

24. The apparatus as defined by claim 1 and additionally including external receiver means registerable with said casing and having at least one optical energy input communications channel coupled to said at least one optical energy output communications channel of said data storage means when in registration therewith and being responsive to said data signals outputted from said memory to automatically execute a desired function.

25. The apparatus as defined by claim 24 wherein said last recited at least one input channel comprises a common optical energy input channel for both data and clock signals.

26. The apparatus as defined by claim 25 wherein said receiver means additionally includes means coupled to said last recited common input channel and being operable to de-multiplex signals applied thereto to provide separate data and clock signals for executing said desired function.

27. A bi-directional data transfer and storage system for on-line communication with telephone apparatus wherein selected data from telephone apparatus is first fed to a portable random access memory which subsequently operates on demand to display said data and/or output selected storage data to external means for dialing a telephone and when desirable thereafter communicating data over a telephone channel, the improvement comprising:

a device carried or worn by the user including a casing, said random access memory housed within said casing, said memory having a plurality of selectable memory addesses for storing respective data signals thereat, address circuitry therefor, manual address selector means on said casing coupled to said address circuitry for accessing a desired memory address, at least one electromagnetic energy input communications channel including electromagnetic energy coupling means coupled to said memory for coupling externally applied alphanumeric data and clock signals thereto for reading selected data signals into a desired address of said memory under the control of said clock signals, an internal source of clock signals and at least one electromagnetic energy output communications channel also including electromagnetic energy coupling means coupled to said memory and said internal source of clock signals for reading out on demand selected data signals from a desired address of said memory and coupling said data signals and said clock signals to said external means.

28. The system as defined by claim 27 wherein said electromagnetic energy coupling means comprises radiant type energy coupling means.

29. The system as defined by claim 27 wherein said electromagnetic energy coupling means comprises induction type energy coupling means.

30. The apparatus as defined by claim 27 wherein said casing comprises a watch type of casing, said casing including means for displaying said data signals.

31. Apparatus as defined by claim 27 wherein said at least one electromagnetic energy input and output communications channel comprises a respective common channel for both data and clock signals.

32. The apparatus as defined by claim 27 wherein said input channel terminates in radio frequency receptor means for receiving both data and clock signals inputted thereto and wherein said output channel terminates in radio frequency source means for transmitting both data and clock signals to external utilization means.

33. The apparatus as defined by claim 27 wherein said at least one electromagnetic energy input and output communications channel additionally includes a respective additional electromagnetic energy input and output communications channel including electromagnetic energy coupling means wherein one input and output channel is adapted to carry said data signals while the other input and output channel is adapted to carry said clock signals.

34. The apparatus as defined by claim 33 wherein the two input communications channels respectively terminate in first and second radio frequency receptor means mounted on said casing for receiving input data and clock signals, and wherein the two output communications channels terminate in respective first and second radio frequency source means mounted on said casing for transmitting data and clock signals to external utilization means.

35. The apparatus as defined by claim 27 and additionally including external electromagnetic energy coupling means operably coupled to said at least one input and output communications channels to bi-directionally transfer selective alphanumeric data into and out of said memory.

36. The apparatus as defined by claim 35 wherein said external electromagnetic energy coupling means is located on a telephone set.

37. The apparatus as defined by claim 27, wherein said device during operation is carried or worn on the person of the user.

38. The apparatus as defined by claim 27, wherein said device comprises a relatively small device carried by or worn on a portion of the body of the user.

* * * * *